US012656505B2

(12) United States Patent
Celik

(10) Patent No.: US 12,656,505 B2
(45) Date of Patent: Jun. 16, 2026

(54) LOW-PROFILE PARASITICALLY-COUPLED PATCH ANTENNA

(71) Applicant: Trimble Inc., Westminster, CO (US)

(72) Inventor: Nuri Celik, Milpitas, CA (US)

(73) Assignee: Trimble Inc., Westminster, CO (US)

( * ) Notice: Subject to any disclaimer, the term of this patent is extended or adjusted under 35 U.S.C. 154(b) by 238 days.

(21) Appl. No.: 18/654,944

(22) Filed: May 3, 2024

(65) Prior Publication Data

US 2024/0288588 A1      Aug. 29, 2024

Related U.S. Application Data

(63) Continuation of application No. 17/344,006, filed on Jun. 10, 2021, now Pat. No. 12,007,489.

(51) Int. Cl.
| | |
|---|---|
| *G01S 19/36* | (2010.01) |
| *H01Q 1/24* | (2006.01) |
| *H01Q 1/48* | (2006.01) |
| *H01Q 5/314* | (2015.01) |
| *H01Q 9/04* | (2006.01) |
| *G01S 19/32* | (2010.01) |

(52) U.S. Cl.
CPC ............... *G01S 19/36* (2013.01); *H01Q 1/24* (2013.01); *H01Q 1/48* (2013.01); *H01Q 5/314* (2015.01); *H01Q 9/0414* (2013.01); *H01Q 9/0464* (2013.01); *G01S 19/32* (2013.01)

(58) Field of Classification Search
CPC .......... G01S 19/36; H01Q 5/314; H01Q 1/24; H01Q 1/48; H01Q 9/0414; H01Q 9/0464
USPC .................................................... 342/357.76
See application file for complete search history.

(56) References Cited

U.S. PATENT DOCUMENTS

| | | | |
|---|---|---|---|
| 4,987,421 A | 1/1991 | Sunahara et al. | |
| 7,436,363 B1 | 10/2008 | Klein et al. | |
| 9,647,328 B2 | 5/2017 | Dobric | |
| 9,711,866 B1 * | 7/2017 | Doane ................... | H01Q 19/13 |
| 11,489,247 B2 | 11/2022 | Zhou et al. | |

(Continued)

FOREIGN PATENT DOCUMENTS

| | | |
|---|---|---|
| CA | 2 621 886 A1 | 8/2008 |
| EP | 3 713 012 A1 | 9/2020 |

(Continued)

OTHER PUBLICATIONS

Extended European Search Report for Application No. EP21191766.1, mailed Nov. 24, 2021, 12 pages.

(Continued)

*Primary Examiner* — Harry K Liu
(74) *Attorney, Agent, or Firm* — Kilpatrick Townsend & Stockton LLP

(57) ABSTRACT
A parasitically-coupled dual-band patch antenna is described. The antenna includes an inner conductor having one or more feed holes. The antenna also includes an outer conductor surrounding the inner conductor in a radial direction. The antenna further includes one or more feeds each having a vertical portion that passes through the feed holes and a horizontal portion that extends in an outward direction from the feed holes toward the outer conductor. The feeds are conductively connected to the outer conductor. The horizontal portion of each of the feeds is separated from and is conductively disconnected from a top surface of the inner conductor.

20 Claims, 22 Drawing Sheets

(56) References Cited

U.S. PATENT DOCUMENTS

| | | | |
|---|---|---|---|
| 12,007,489 | B2 | 6/2024 | Celik |
| 12,445,192 | B2 * | 10/2025 | Grilli ................. H04B 7/18513 |
| 2015/0123869 | A1 | 5/2015 | Bit-Babik et al. |
| 2018/0203966 | A1 * | 7/2018 | Tsang ...................... G06F 30/30 |
| 2022/0311142 | A1 * | 9/2022 | Hwang ................... H01Q 5/40 |
| 2022/0397683 | A1 | 12/2022 | Celik |
| 2023/0198553 | A1 * | 6/2023 | Kim ...................... H01Q 9/045 |
| | | | 370/329 |

FOREIGN PATENT DOCUMENTS

| | | | |
|---|---|---|---|
| WO | 2016/109403 | A1 | 7/2016 |
| WO | 2019/072391 | A1 | 4/2019 |

OTHER PUBLICATIONS

Boyko, S. N. et al., "EBG Metamaterial Ground Plane Application for GNSS Antenna Multipath Mitigating", The 2015 International Workshop on Antenna Technology (iWAT), IEEE, vol. 15, No. 4, Mar. 4, 2015, pp. 178-181.

Ruvio, G. et al., "Radial EBG Cell Layout for GPS Patch Antennas", Electronics Letters, The Institution of Engineering and Technology, vol. 45, No. 13, Jun. 18, 2009, 2 pages.

Tanabe, M. et al., "A Bent-Ends Spiral Antenna Above a Fan-Shaped Electromagnetic Band-Gap Structure", 9th European Conference on Antennas and Propagation (EUCAP), Apr. 13, 2015, 4 pages.

U.S. Appl. No. 17/344,006 Non-Final Office Action mailed Oct. 19, 2023, 8 pages.

U.S. Appl. No. 17/344,006 Notice of Allowance mailed Feb. 8, 2024, 7 pages.

* cited by examiner

Receive, by high-frequency patch, radio waves at upper frequency band
1502

Receive, by low-frequency patch, radio waves at lower frequency band
1504

Carry, using one or more feeds, radio waves at upper frequency band received by high-frequency patch and radio waves at lower frequency band received by low-frequency patch
1506

1500

LOW-PROFILE PARASITICALLY-COUPLED PATCH ANTENNA

CROSS-REFERENCES TO RELATED APPLICATIONS

This application is a continuation of U.S. application Ser. No. 17/344,006, filed Jun. 10, 2021, entitled "LOW-PROFILE PARASITICALLY-COUPLED PATCH ANTENNA," the entire contents of which are incorporated herein by reference for all purposes.

BACKGROUND OF THE INVENTION

A conventional stacked patch antenna may include two or more separate antennas, which may be substantially flat antennas that are stacked on top of each other and separated vertically. The antennas at upper levels are generally smaller in size and are configured to receive and/or transmit radio waves at higher frequencies than the antennas at lower levels, which are generally larger in size. These multiple antennas may have separate feeds and are able to operate independently from each other if there is enough separation between the antennas' frequency ranges. For example, the antennas may be configured to operate within multiple separate frequency ranges for applications in which it is desirable that a single antenna structure be used to cover multiple separate frequency ranges simultaneously.

Such a stacked patch antenna has an increased height compared to many antenna designs, as well as a higher cost due to the complicated assembly and amount of high-quality conductive and dielectric materials used. Furthermore, due to the limited available vertical space being divided between the antennas, the resulting bandwidth of the conventional stacked patch antenna is lower than what is desired in many applications, such as the reception of satellite signals for providing three dimensional (3D) positioning. As such, new antenna designs and methods for their operation are needed to enable compact and low-cost device design.

BRIEF SUMMARY OF THE INVENTION

Embodiments described herein relate broadly to antennas that can operate in multiple separate frequency bands with high efficiency. Specifically, embodiments provide parasitically-coupled dual-band patch antennas with high-frequency and low-frequency patches that are (quasi) co-planar, allowing the patches to utilize all the available vertical space instead of only a smaller portion thereof, thereby improving performance. In an embodiment, for example, an inner conductor may form a high-frequency patch and an outer conductor that is separated from the inner conductor may form a low-frequency patch.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is an antenna structure comprising: an inner conductor being substantially planar and having at least one feed hole, the inner conductor forming a high-frequency patch; an outer conductor being substantially planar and surrounding the inner conductor in a radial direction, the outer conductor forming a low-frequency patch; and one or more feeds each having a vertical portion that passes through one of the at least one feed hole and a horizontal portion that extends in an outward direction from the at least one feed hole toward the outer conductor and is conductively connected to the outer conductor, wherein the horizontal portion of each of the one or more feeds is separated from and is conductively disconnected from a top surface of the inner conductor.

Example 2 is the antenna structure of example(s) 1, further comprising: a ground plane disposed below the inner conductor and the outer conductor, wherein the ground plane is electrically conducting.

Example 3 is the antenna structure of example(s) 2, further comprising: a dielectric layer disposed between the ground plane and the inner conductor, wherein the dielectric layer is electrically insulating.

Example 4 is the antenna structure of example(s) 1-3, wherein the one or more feeds extend through the dielectric layer.

Example 5 is the antenna structure of example(s) 1-4, wherein the outer conductor is vertically offset from the inner conductor.

Example 6 is the antenna structure of example(s) 5, further comprising: a spacing layer disposed between the inner conductor and the outer conductor, wherein the spacing layer is electrically insulating.

Example 7 is the antenna structure of example(s) 1-6, further comprising: a filter disposed along an outer edge of the outer conductor, the filter being configured to at least partially block electrical signals at an intermediate frequency band and to let pass electrical signals at a lower frequency band.

Example 8 is the antenna structure of example(s) 7, wherein a magnitude of an impedance of the filter is greater at the intermediate frequency band than the magnitude of the impedance of the filter at each of the lower frequency band and the upper frequency band.

Example 9 is the antenna structure of example(s) 1-8, wherein one or both of the inner conductor and the outer conductor is circular.

Example 10 is the antenna structure of example(s) 1-9, wherein the one or more feeds are configured to carry radio waves at an upper frequency band received by the high-frequency patch and radio waves at a lower GNSS frequency band received by the low-frequency patch.

Example 11 is the antenna structure of example(s) 1-10, wherein the horizontal portion of each of the one or more feeds is horizontally or vertically tapered in the outward direction.

Example 12 is a global navigation satellite system (GNSS) receiver comprising: an antenna configured to receive radio waves at global navigation satellite system (GNSS) frequencies, the antenna comprising: an inner conductor being substantially planar and having at least one feed hole, the inner conductor forming a high-frequency patch; an outer conductor being substantially planar and surrounding the inner conductor in a radial direction, the outer conductor forming a low-frequency patch; and one or more feeds each having a vertical portion that passes through one of the at least one feed hole and a horizontal portion that extends in an outward direction from the at least one feed hole toward the outer conductor and is conductively connected to the outer conductor, wherein the horizontal portion of each of the one or more feeds is separated from and is conductively disconnected from a top surface of the inner conductor.

Example 13 is the GNSS receiver of example(s) 12, wherein the antenna further comprises: a ground plane disposed below the inner conductor and the outer conductor, wherein the ground plane is electrically conducting.

Example 14 is the GNSS receiver of example(s) 13, wherein the antenna further comprises: a dielectric layer disposed between the ground plane and the inner conductor, wherein the dielectric layer is electrically insulating.

Example 15 is the GNSS receiver of example(s) 12-14, wherein the antenna further comprises: a filter disposed along an outer edge of the outer conductor, the filter being configured to at least partially block electrical signals at an intermediate frequency band and to let pass electrical signals at a lower frequency band.

Example 16 is the GNSS receiver of example(s) 12-15, wherein the horizontal portion of each of the one or more feeds is horizontally or vertically tapered in the outward direction.

Example 17 is a method of receiving radio waves by an antenna structure, the method comprising: receiving, by a high-frequency patch of the antenna, radio waves at an upper frequency band, wherein the high-frequency patch is formed by an inner conductor having at least one feed hole; receiving, by a low-frequency patch of the antenna, radio waves at a lower frequency band, wherein the low-frequency patch is formed by an outer conductor surrounding the inner conductor in a radial direction; and carrying, using one or more feeds conductively connected to the outer conductor, the radio waves at the upper frequency band received by the high-frequency patch and the radio waves at the lower frequency band received by the low-frequency patch, wherein each of the one or more feeds has a vertical portion that passes through one of the at least one feed hole and a horizontal portion that extends in an outward direction from the at least one feed hole toward the outer conductor, wherein the horizontal portion of each of the one or more feeds is separated from and is conductively disconnected from a top surface of the inner conductor.

Example 18 is the method of example(s) 17, wherein the antenna further comprises a ground plane disposed below the inner conductor and the outer conductor, wherein the ground plane is electrically conducting.

Example 19 is the method of example(s) 18, wherein the antenna further comprises a dielectric layer disposed between the ground plane and the inner conductor, wherein the dielectric layer is electrically insulating.

Example 20 is the method of example(s) 17-19, wherein the antenna further comprises a filter disposed along an outer edge of the outer conductor, the filter being configured to at least partially block electrical signals at an intermediate frequency band and to let pass electrical signals at a lower frequency band.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF THE INVENTION

Embodiments of the present invention provide for a parasitically-coupled dual-band patch antenna. The antenna may include an outer conductor that forms a low-frequency patch. The outer conductor may be conductively connected to one or more feeds along its inner edge. The antenna may also include an inner conductor that is surrounded by the outer conductor and which forms a high-frequency patch. The feeds may be arranged to extend upwards along the center of the antenna, pass through one or more holes in the inner conductor, and then spread out in the outward radial direction toward the inner edge of the outer conductor. The inner conductor may be completely conductively discon- nected from the feeds, such that radio frequency (RF) signals may pass between the feeds and the inner conductor through parasitic coupling.

As used herein, a component may be considered to be "electrically conductive" if the component is composed of a conductive material and/or direct current (DC) (or DC electric current) is capable of flowing through the compo- nent. Furthermore, as used herein, a component may be considered to be "electrically insulating" if the component is not composed of a conductive material (e.g., is composed of an insulator) and/or DC electric current is incapable of flowing through the component.

Furthermore, as used herein, two components that are electrically conductive may be considered to be "conduc- tively connected" to each other if DC electric current is capable of flowing between the two components, either directly between the first component and the second com- ponent or via a third component that is physically connected to each of the two components that is also electrically conductive.

Furthermore, as used herein, two components that are electrically conductive may be considered to be "conduc- tively disconnected" from each other if DC electric current is incapable of flowing between the two components directly between the first component and the second component and if no third component exists that is physically connected to each of the two components that is also electrically conduc- tive.

Figures 1A, 1B:
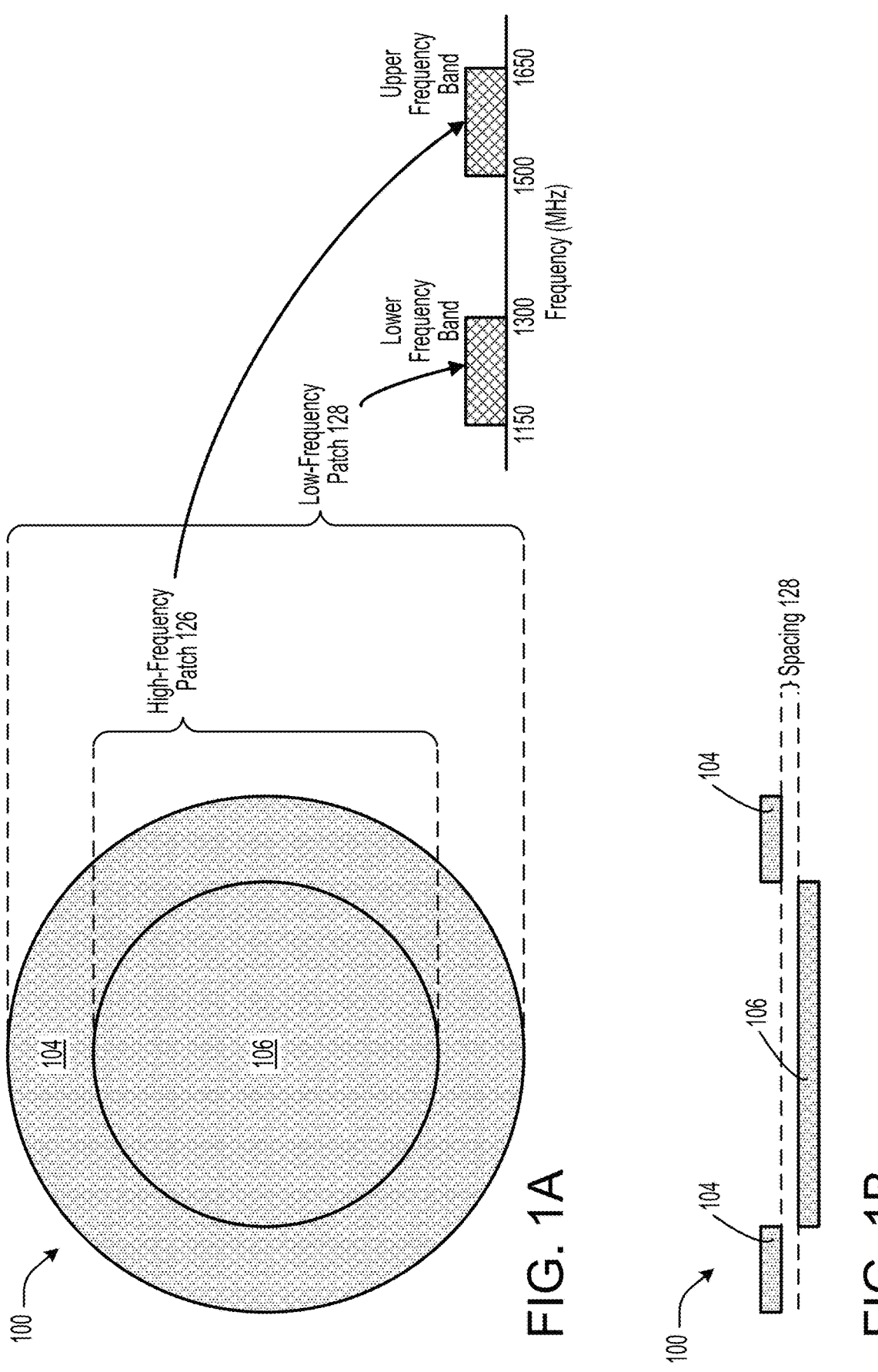
FIG. 1A illustrates a simplified top view of a portion of a dual-band patch antenna.
FIG. 1B illustrates a simplified cross section of a portion of a dual-band patch antenna.

FIGS. 1A and 1B illustrate a simplified top view and cross section, respectively, of a portion of a dual-band patch antenna 100, in accordance with some embodiments of the present invention. Antenna 100 may include an inner con- ductor 106 and an outer conductor 104, both of which are electrically conductive. Inner conductor 106 may be a cir- cular- or rectangular-shaped material that is substantially flat. Inner conductor 106 may comprise a conductive mate- rial, such as copper, and may overlay and be disposed above a dielectric layer and a ground plane (not shown). Inner conductor 106 may form a high-frequency patch 126 (or high-frequency patch antenna) that is configured to operate within a band of frequencies referred to herein as an upper frequency band. In one example, the upper frequency band may include frequencies between 1500 MHz and 1650 MHz. In another example, the upper frequency band may include frequencies between 1525 MHz and 1614 MHz.

Outer conductor 104 may surround inner conductor 106 in the radial direction and may be separated from and conduc- tively disconnected from inner conductor 106. Outer con- ductor 104 may be a circular- or rectangular ring-shaped material that is substantially flat and substantially parallel to inner conductor 106, optionally separated by a spacing 128 in the vertical direction. In some embodiments, inner con- ductor 106 and outer conductor 104 may be substantially coplanar. Outer conductor 104 may comprise a conductive material, such as copper, and may overlay and be disposed above the dielectric layer and the ground plane. Outer conductor 104 (and, in some embodiments, in combination with inner conductor 106) may form a low-frequency patch 128 (or low-frequency patch antenna) that is configured to operate within a band of frequencies referred to herein as a lower frequency band. The lower frequency band may be non-overlapping and lower than the upper frequency band. In one example, the lower frequency band may include frequencies between 1150 MHz and 1300 MHz. In another example, the lower frequency band may include frequencies between 1164 MHz and 1300 MHz.

In some embodiments, lower and upper frequency bands may correspond to two frequency bands where most global navigation satellite system (GNSS) frequencies can be trans- mitted and received. A GNSS uses medium Earth orbit (MEO) satellites to provide geospatial positioning of receiv- ing devices. Typically, wireless signals transmitted from such satellites can be used by GNSS receivers to determine their position, velocity, and time. Examples of currently operational GNSSs include the United States' Global Posi- tioning System (GPS), Russia's Global Navigation Satellite System (GLONASS), China's BeiDou Satellite Navigation System, the European Union's (EU) Galileo, Japan's Quasi- Zenith Satellite System (QZSS), and the Indian Regional Navigation Satellite System (IRNSS). Many of the frequen- cies of the above-listed GNSSs may lie within one or both of the lower and upper frequency bands. For example, GPS satellites may broadcast L1 signals at 1.57542 GHz (in the upper frequency band) and L2 signals at 1.2276 GHz (in the lower frequency band).

Figures 2A, 2B, 2C:
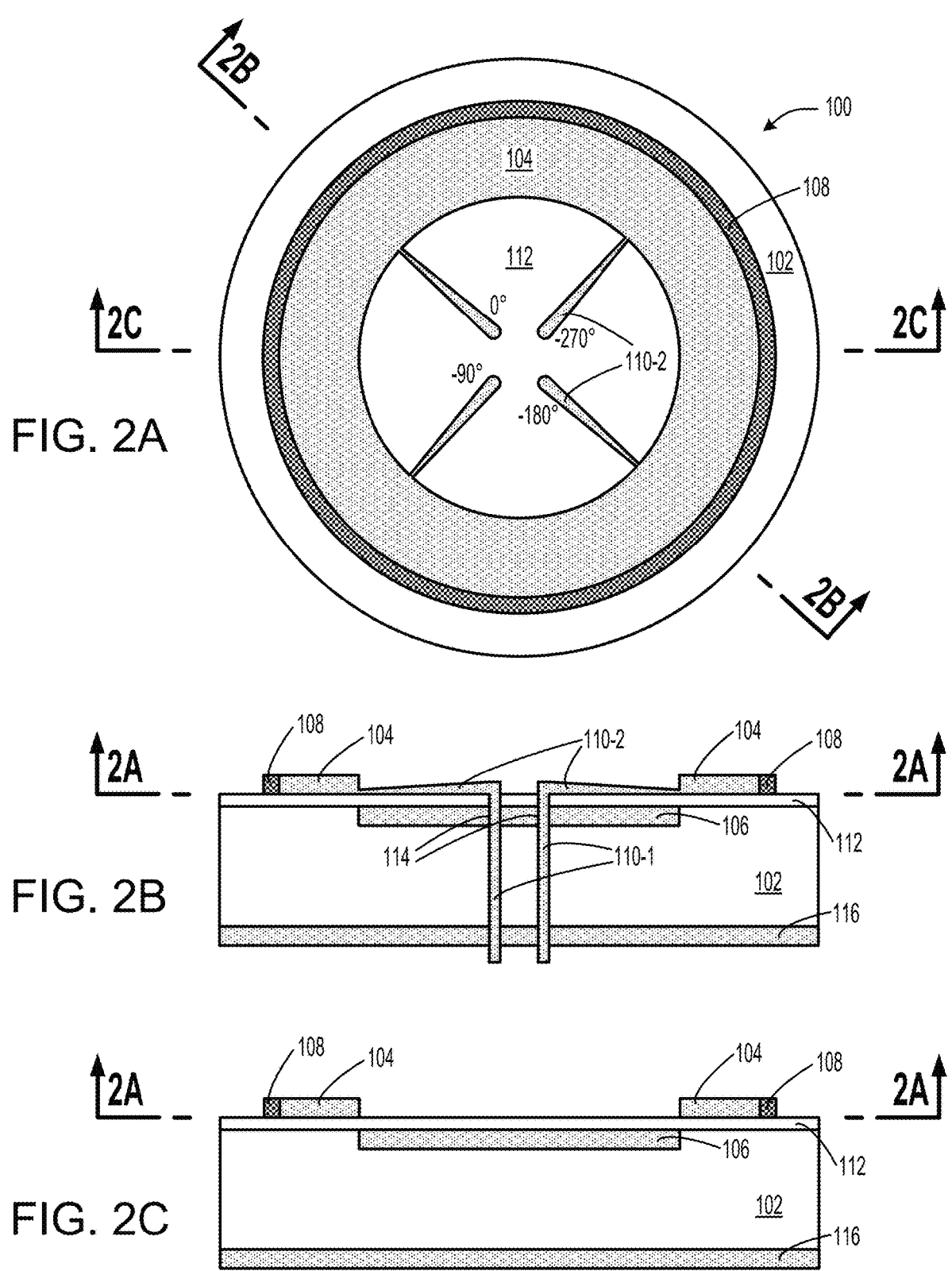
FIG. 2A illustrates a simplified top view of a dual-band patch antenna.
FIG. 2B illustrates a simplified first cross section of a dual-band patch antenna.
FIG. 2C illustrates a simplified second cross section of a dual-band patch antenna.

FIGS. 2A, 2B, and 2C illustrate a simplified top view, first cross section, and second cross section, respectively, of dual-band patch antenna 100, in accordance with some embodiments of the present invention. FIG. 2B illustrates a simplified cross section along line 2B-2B of antenna 100 shown in FIG. 2A, and FIG. 2C illustrates a simplified cross section along line 2C-2C of antenna 100 shown in FIG. 2A. As described in reference to FIGS. 1A and 1B, antenna 100 includes inner conductor 106 and outer conductor 104. In some embodiments, the dimensions of inner conductor 106 and outer conductor 104, such as their diameters, widths, heights, etc., may be determined based on their desired radiation patterns, operating frequencies, and/or band- widths.

In some embodiments, antenna 100 may include one or more materials that are electrically insulating. For example, in some embodiments, inner conductor 106 may overlay a dielectric layer 102, which may be electrically insulating. Furthermore, in some embodiments, a spacing layer 112 may be disposed between inner conductor 106 and outer conductor 104. Each of dielectric layer 102 and spacing layer 112 may comprise a non-conductive material and/or dielectric material such as a plastic, ceramic, or air, while inner conductor 106 and outer conductor 104 may comprise a conductive material such as a metal or alloy. In some embodiments, dielectric layer 102 may be substantially the same shape as outer conductor 104 and may have a diameter that is greater than an outside diameter of outer conductor 104.

In some embodiments, antenna 100 may include one or more feed(s) 110 that carry RF signals that are to be transmitted via high-frequency patch 126 and/or low-fre- quency patch 128 as well as RF signals that are received via high-frequency patch 126 and/or low-frequency patch 128. As such, feed(s) 110 may be electrically conductive. Each of feed(s) 110 may include a vertical portion of feed(s) 110-1 (or simply "vertical portion(s) 110-1") and a horizontal portion of feed(s) 110-2 (or simply "horizontal portion(s) 110-2"). Each of vertical portion(s) 110-1 may extend upward through dielectric layer 102 and pass through one or more feed hole(s) 114 of inner conductor 106. Each of feed hole(s) 114 may be circular or otherwise shaped to match an outer shape of vertical portions 110-1.

Vertical portion(s) 110-1 may be conductively disconnected from inner conductor 106. For example, vertical portion(s) 110-1 may be covered in a dielectric material that prevents the conductive material of vertical portion(s) 110-1 from coming into physical contact with inner conductor 106. In some implementations, vertical portions(s) 110-1 may consist of coaxial cables having an inner wire surrounded by a dielectric material and further surrounded by a concentric outer conducting shield. Vertical portion(s) 110-1 may pass through feed hole(s) 114 and further pass through spacing layer 112, connecting with horizontal portion(s) 110-2 above spacing layer 112. In the coaxial cable case, the inner wire may pass through feed hole(s) 114 and further pass through spacing layer 112, connecting with horizontal portion(s) 110-2 above spacing layer 112. Similarly, in some implementations, the outer conducting shield may connect to the inner conductor 106 as well as to ground plane 116.

Horizontal portion(s) 110-2 may extend in an outward direction (e.g., in an outward radial direction) from feed hole(s) 114 toward outer conductor 104. Horizontal portion (s) 110-2 may connect to an inner edge of outer conductor 104 and may therefore be conductively connected to outer conductor 104. Similar to vertical portion(s) 110-1, horizontal portion(s) 110-2 may be conductively disconnected from inner conductor 106. For example, horizontal portion(s) 110-2 may be separated from the top surface of inner conductor 106 by spacing layer 112.

Horizontal portion(s) 110-2 may be considered to be parasitically connected to inner conductor 106. For example, RF signals being transmitted by antenna 100 that are being carried by horizontal portions(s) 110-2 may cross spacing layer 112 and enter into inner conductor 106. As another example, RF signals being received by antenna 100 that are being carried by inner conductor 106 may cross spacing layer 112 and enter into horizontal portions(s) 110-2. The point at which the RF signals enter or exit inner conductor 106 may be referred to as the high-frequency feed point. If multiple feeds 110 are utilized, inner conductor 106 may include multiple high-frequency feed points.

In some embodiments, the high-frequency feed points may be adjusted in the radial direction by providing horizontal portion(s) 110-2 with a tapered shape. For example, horizontal portion(s) 110-2 may be horizontally and/or vertically tapered so that an effective radius or width of each of horizontal portion(s) 110-2 decreases in the outward radial direction and, conversely, increases in the inward radial direction. In the illustrated example, each of horizontal portion(s) 110-2 is both horizontally and vertically tapered.

While the illustrated example shows four feeds 110, other embodiments may include a different number of feeds (more or less). Feed(s) 110 provide an electrical connection between antenna 100 and the remaining circuitry of the transmitter and/or receiver, such as an RF front end and/or receiver processor. Hence, feed(s) 110 provide electrical connectivity for both high-frequency patch 126 and low-frequency patch 128.

In some embodiments, vertical portions 110-1 may be evenly spaced around a center location of antenna 100 so that each of feeds 110 is spaced from adjacent feeds 110 by approximately equal angular intervals. The example shown in FIGS. 2A-2C includes four feeds 110, and each of feeds 110 are spaced from adjacent feeds by approximately 90°. For a patch antenna with six feeds, the angular spacing would be approximately 60°. For a patch antenna with eight feeds, the angular spacing would be approximately 45°, and so on.

The placement of feeds 110 around the center of antenna 100 allows feeds 110 to be phased to provide circular polarization. For example, signals associated with the four feeds 110 shown in FIG. 2A may each have a phase that differs from the phase of an adjacent feed by +90° and that differs from the phase of another adjacent feed by −90°. In some embodiments, the feeds are phased in accordance with known techniques to provide right-handed circular polarization (RHCP) and suppress left-handed circular polarization (LHCP). The number of feeds may be determined based on a desired bandwidth of the patch antenna as well as the desired interference/multipath immunity, i.e., the LHCP suppression.

In some embodiments, antenna 100 may further include a ground plane 116 that may be electrically grounded and conductively disconnected from inner conductor 106 and outer conductor 104. Ground plane 116 may be coupled to a bottom surface of dielectric layer 102 and may have a similar shape. In some embodiments, feed(s) 110 may be coaxial cables whose concentric outer conducting shields are electrically connected to ground plane 116.

In some embodiments, antenna 100 may further include a filter 108 disposed along the outer edge of outer conductor 104. Filter 108 may be physically connected to and conductively connected to outer conductor 104. Filter 108 may partially or completely block electrical signals in an intermediate frequency band and/or the upper frequency band from moving through filter 108. For example, when antenna 100 is transmitting radio waves, filter 108 may partially or completely block electrical signals in the intermediate frequency band and/or the upper frequency band from moving through filter 108. As another example, when antenna 100 is receiving radio waves, filter 108 may partially or completely block electrical signals in the intermediate frequency band and/or the upper frequency band from moving through filter 108. In contrast, during transmission or reception of radio waves, electrical signals in the lower frequency band may move freely through filter 108. In some embodiments, during either transmission or reception of radio waves, electrical signals in the upper frequency band do not exist on outer conductor 104 so the filter's response to the upper frequency band signals may be impertinent.

In some cases, filter 108 may provide a frequency-dependent impedance. The impedance of filter 108 may be significantly more inductive than capacitive in the lower frequency band and significantly more capacitive than inductive in the upper frequency band. In some cases, the magnitude of the impedance of filter 108 may be less than a threshold in each of the lower and upper frequency bands so as to prevent standing wave behavior in those bands. In some embodiments, filter 108 may include one or more capacitive elements and/or one or more inductive elements that provide the frequency-dependent impedance of filter 108. For example, filter 108 may include multiple filter elements that each include a capacitor and an inductor arranged in a parallel circuit. The resonant frequency of each parallel circuit may be tuned (e.g., by adjusting capacitance and/or inductance values) to provide the desired impedance at the lower and upper frequency bands.

In some implementations, one or both of dielectric layer 102 and spacing layer 112 may be made up of an FR4 or other printed circuit board (PCB) material. For example, portions of antenna 100 may be fabricated using a double-sided PCB structure consisting of a FR4 core sandwiched between top and bottom copper layers. Horizontal portions 110-2, outer conductor 104, and filter 108 may be formed by etching the top copper layer of the double-sided PCB structure, inner conductor 106 may be formed by etching the bottom copper layer, and the FR4 core may serve as spacing layer 112. In some implementations, a second FR4 board may be used, with the copper layer serving as ground plane 116 and the FR4 serving as dielectric layer 102. The two FR4 boards or PCB structures may be stacked during fabrication. In some embodiments, dielectric layer 102 may include one or more layers and optionally including one or more air gaps. In some embodiments, dielectric layer 102 may include specific cut-out patterns. For example, dielectric layer 102 may include a plastic material with a particular cut-out pattern with air gaps to increase the antenna gain and efficiency.

Figures 2D, 2E:
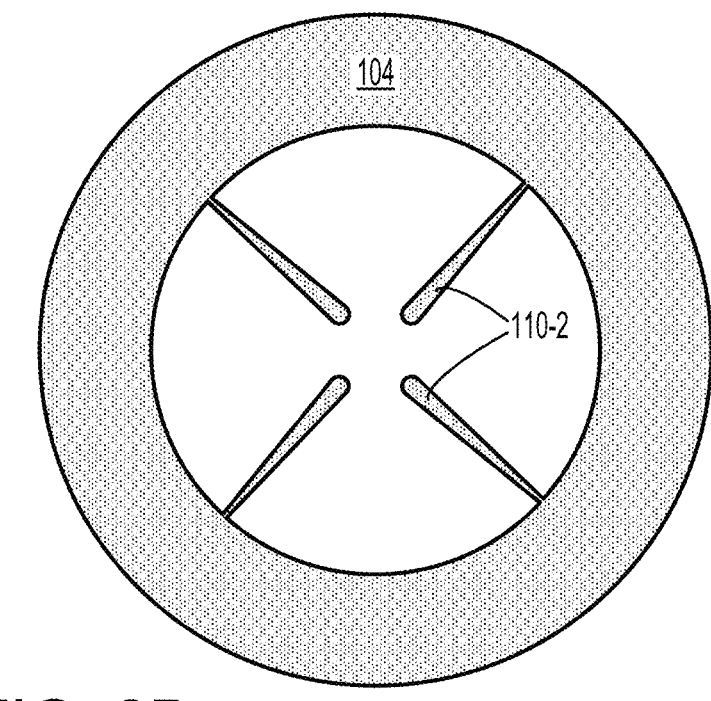
FIG. 2D illustrates a simplified top view of a portion of an antenna.
FIG. 2E illustrates a simplified top view of a portion of an antenna.

FIGS. 2D and 2E illustrate simplified top views of portions of antenna 100, in accordance with some embodiments of the present invention. Specifically, FIG. 2D shows outer conductor 104 and horizontal portions 110-2, and FIG. 2E shows inner conductor 106 and four feed holes 114. As described above, in some implementations, outer conductor 104 and horizontal portions 110-2 may be etched from the top copper layer of a double-sided PCB structure and inner conductor 106 having feed holes 114 may be etched from the bottom copper layer.

Figures 3A, 3B, 3C:
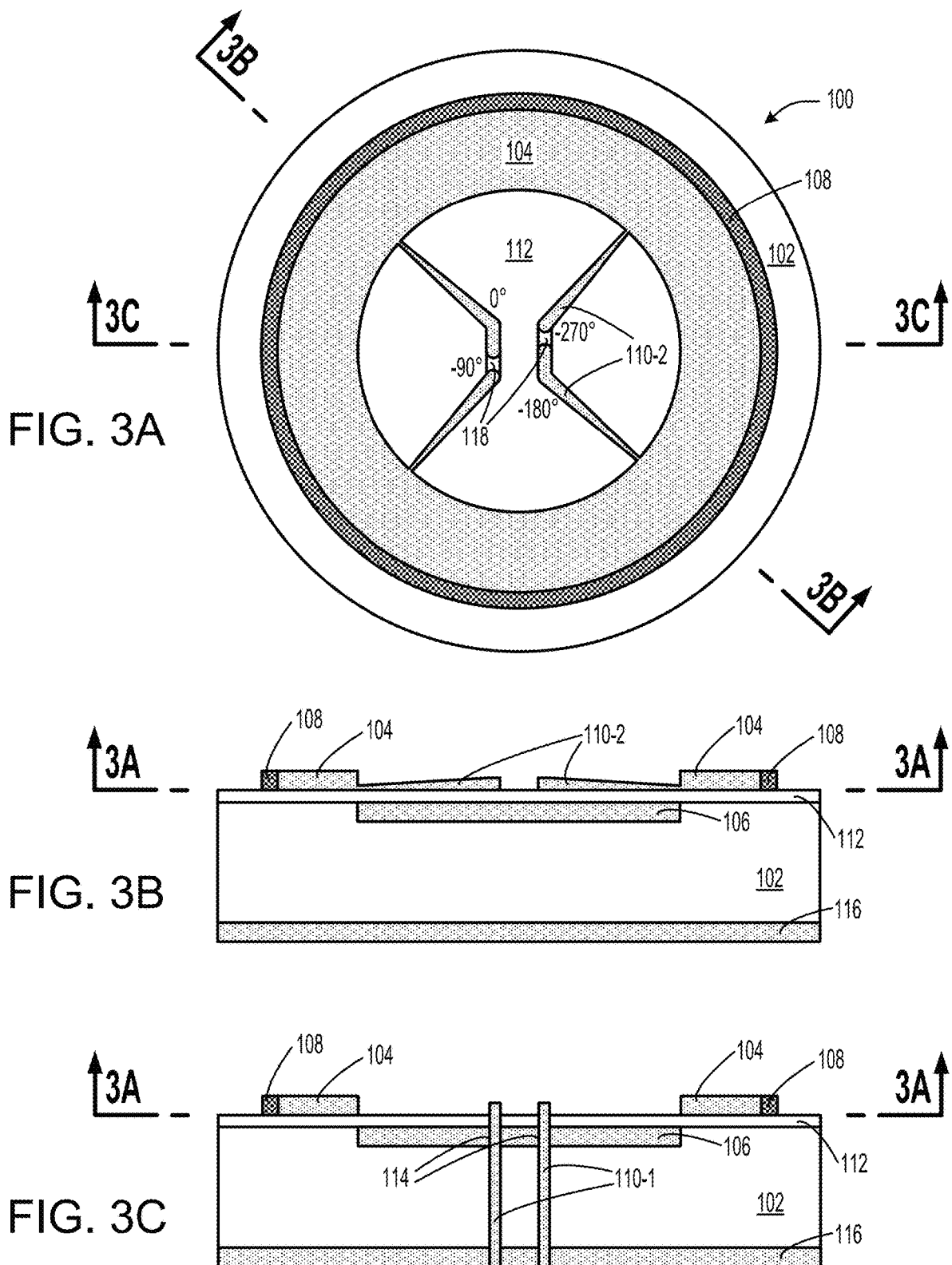
FIG. 3A illustrates a simplified top view of an antenna.
FIG. 3B illustrates a simplified first cross section of an antenna.
FIG. 3C illustrates a simplified second cross section of an antenna.

FIGS. 3A, 3B, and 3C illustrate a simplified top view, first cross section, and second cross section, respectively, of antenna 100, in accordance with some embodiments of the present invention. FIG. 3B illustrates a simplified cross section along line 3B-3B of antenna 100 shown in FIG. 3A, and FIG. 3C illustrates a simplified cross section along line 3C-3C of antenna 100 shown in FIG. 3A.

Antenna 100 illustrated in FIGS. 3A-3C differs from antenna 100 illustrated in FIGS. 2A-2C in that feed(s) 110 include two vertical portions 110-1 and four horizontal portions 110-2, and that antenna further includes phase shifters 118 for providing RF signals with the proper phases. In some embodiments, the two vertical portions 110-1 may be provided with RF signals with a 180° phase difference, and phase shifters 118 may be used to produce four different RF signals with 0°, −90°, −180°, and −270° relative phases to travel along feed(s) 110. In various embodiments, the two vertical portions 110-1 may be provided with RF signals with a 90°, 180°, or 270° phase difference, among other possibilities, which can be used to produce the four different RF signals with 0°, −90°, −180°, and −270° relative phases.

Figure 3D:
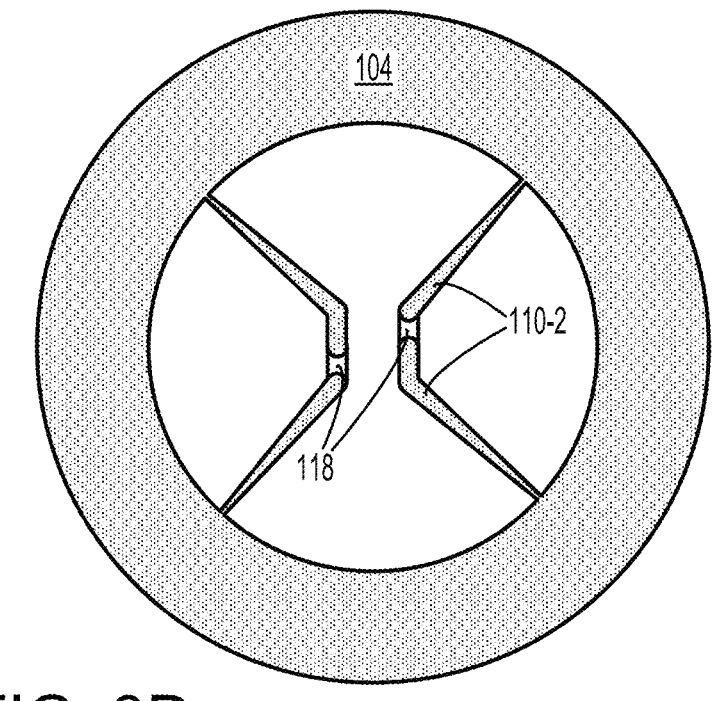
FIG. 3D illustrates a simplified top view of a portion of an antenna.
Figure 3E:
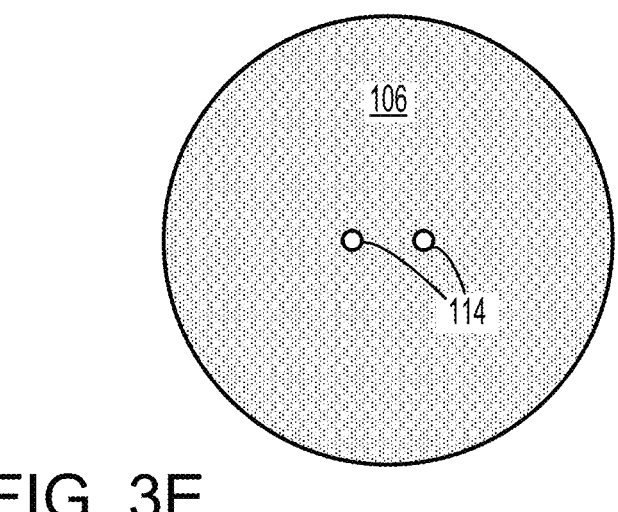
FIG. 3E illustrates a simplified top view of a portion of an antenna.

FIGS. 3D and 3E illustrate simplified top views of portions of antenna 100, in accordance with some embodiments of the present invention. Specifically, FIG. 3D shows outer conductor 104, horizontal portions 110-2, and phase shifters 118, and FIG. 3E shows inner conductor 106 and two feed holes 114. As described above, in some implementations, outer conductor 104 and horizontal portions 110-2 may be etched from the top copper layer of a double-sided PCB structure and inner conductor 106 having feed holes 114 may be etched from the bottom copper layer.

Figures 4A, 4B, 4C:
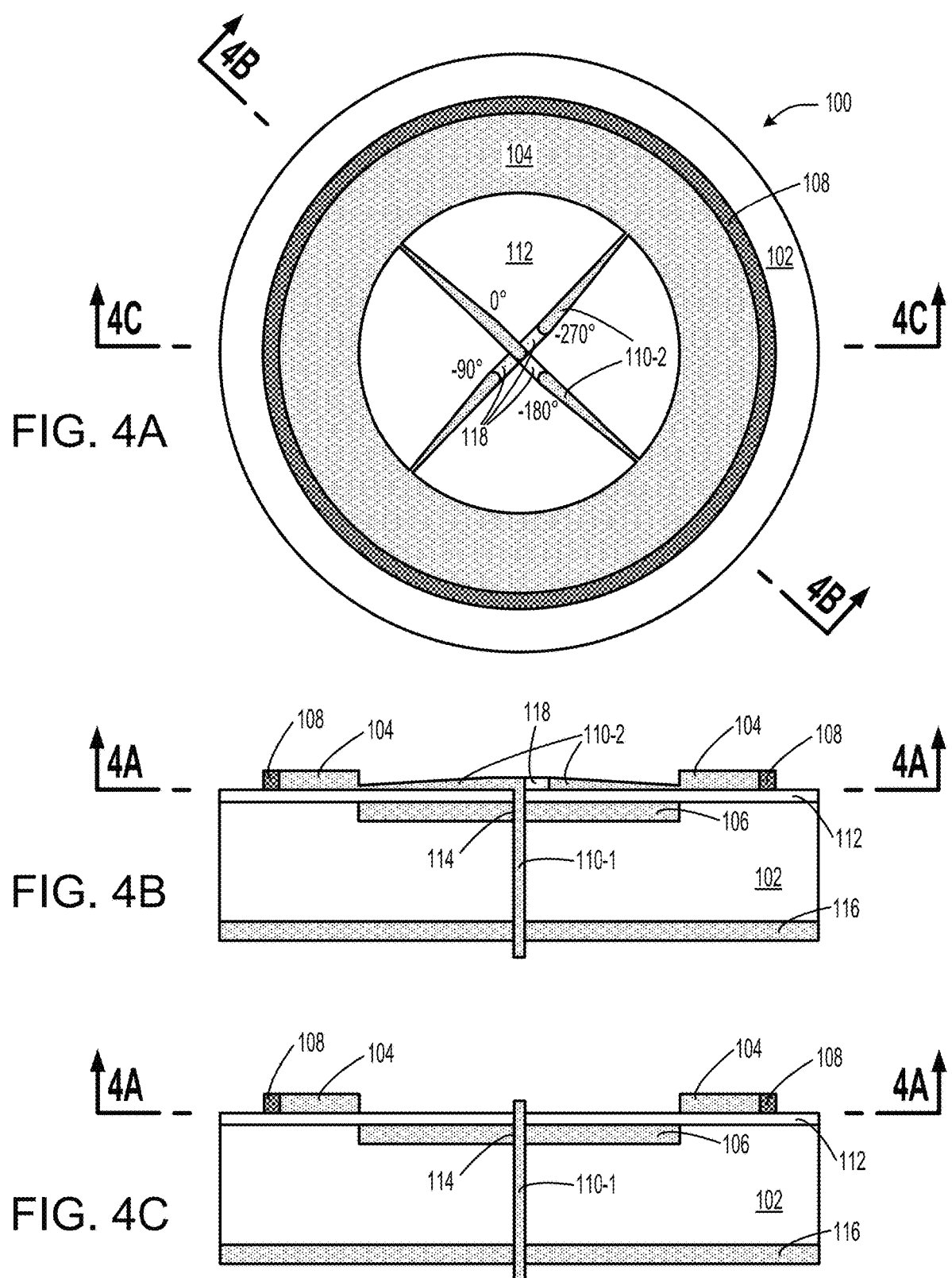
FIG. 4A illustrates a simplified top view of an antenna.
FIG. 4B illustrates a simplified first cross section of an antenna.
FIG. 4C illustrates a simplified second cross section of an antenna.

FIGS. 4A, 4B, and 4C illustrate a simplified top view, first cross section, and second cross section, respectively, of antenna 100, in accordance with some embodiments of the present invention. FIG. 4B illustrates a simplified cross section along line 4B-4B of antenna 100 shown in FIG. 4A, and FIG. 4C illustrates a simplified cross section along line 4C-4C of antenna 100 shown in FIG. 4A.

Antenna 100 illustrated in FIGS. 4A-4C differs from antennas 100 illustrated in FIGS. 2A-2C and FIGS. 3A-3C in that feed(s) 110 include one vertical portion 110-1 and four horizontal portions 110-2, and that antenna further includes phase shifters 118 for providing RF signals with the proper phases. In some embodiments, vertical portion 110-1 may be provided with an RF signal and phase shifters 118 may be used to produce four different RF signals with 0°, −90°, −180°, and −270° relative phases to travel along feed(s) 110. In some embodiments, vertical portion 110-1 may be provided with an RF signal with a relative phase of 0°, which can be used to produce the four different RF signals with 0°, −90°, −180°, and −270° relative phases.

Figures 4D, 4E:
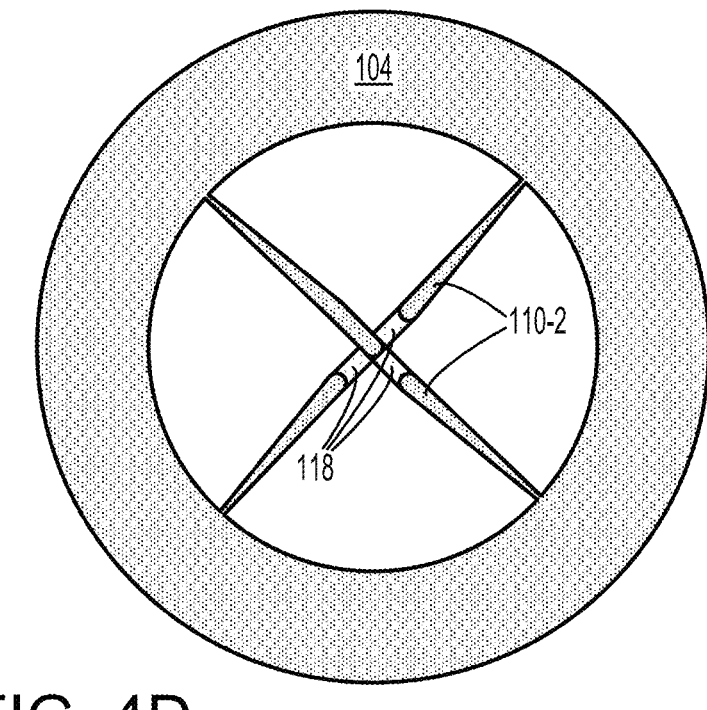
FIG. 4D illustrates a simplified top view of a portion of an antenna.
FIG. 4E illustrates a simplified top view of a portion of an antenna.

FIGS. 4D and 4E illustrate simplified top views of portions of antenna 100, in accordance with some embodiments of the present invention. Specifically, FIG. 4D shows outer conductor 104, horizontal portions 110-2, and phase shifters 118, and FIG. 4E shows inner conductor 106 and one feed hole 114. As described above, in some implementations, outer conductor 104 and horizontal portions 110-2 may be etched from the top copper layer of a double-sided PCB structure and inner conductor 106 having feed hole 114 may be etched from the bottom copper layer.

Figure 5:
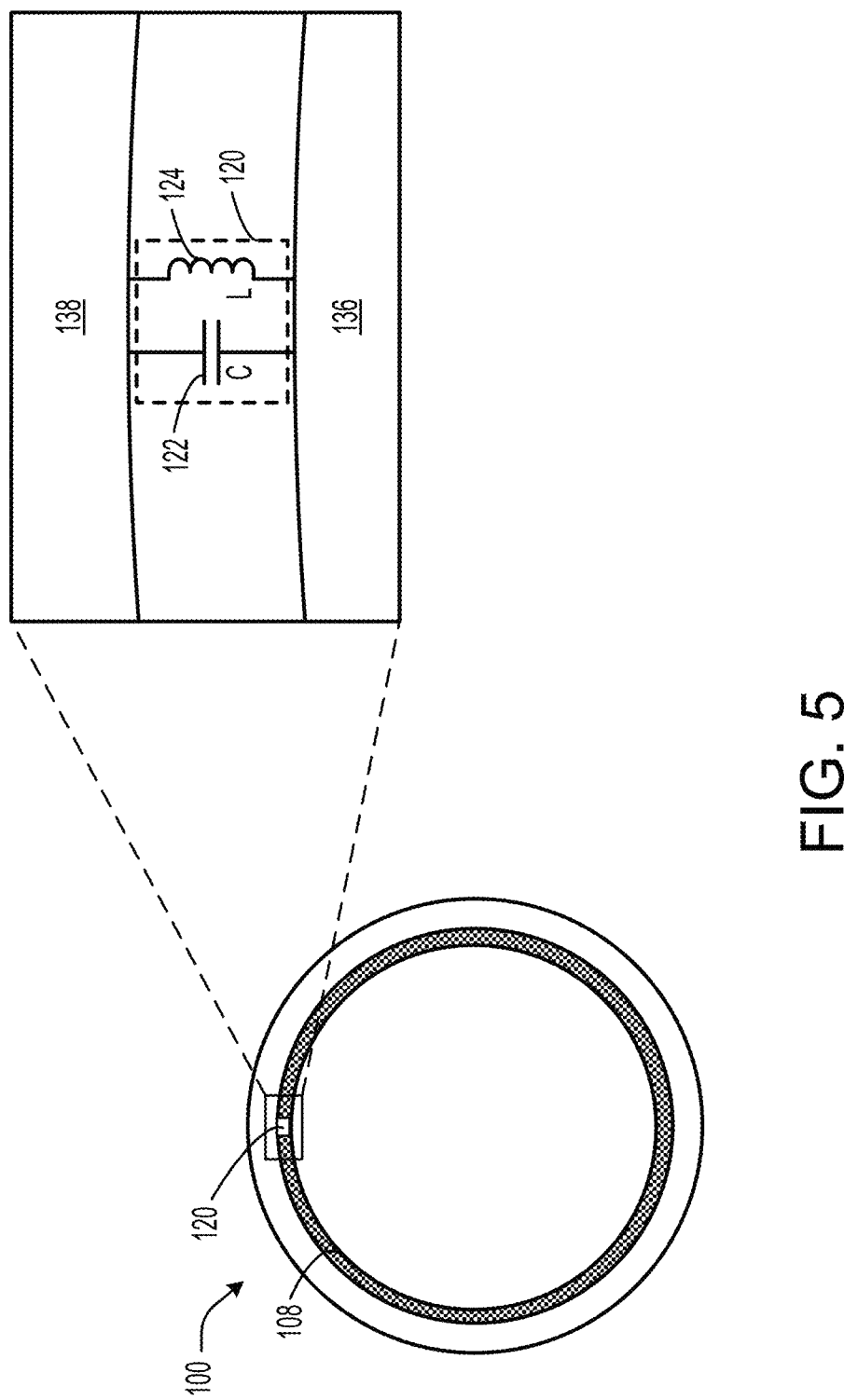
FIG. 5 illustrates a simplified top view of an antenna.

FIG. 5 illustrates a simplified top view of antenna 100, in accordance with some embodiments of the present invention. In the illustrated example, filter 108 includes a single filter element 120 that extends between two conductive elements 136 and 138. Filter element 120 may include a parallel circuit comprising a capacitive element 122 (e.g., a capacitor C) with a capacitance value C and an inductive element 124 (e.g., an inductor L) with an inductance value L. The parallel circuit may alternatively be referred to as a resonant circuit or a tuned circuit. In some embodiments, the resonant frequency $f_R$ of the parallel circuit may be expressed as $f_R = 1/(2\pi\sqrt{LC})$. As such, the resonant frequency $f_R$ may be adjusted by modifying the capacitance and inductance values C and L.

In various embodiments, capacitive element 122 and inductive element 124 may be lumped elements or distributed elements. For example, capacitive element 122 may be a discrete capacitor, such as a ceramic capacitor, film capacitor, or electrolytic capacitor. As another example, capacitive element 122 may be formed by spacing portions of conductive elements 136 and 138 at a particular distance apart from each other and over a particular length of filter 108. As such, filter element 120 may be confined to a single location along filter 108 (such as at the 0° position) or may be distributed across a length of filter 108 (such as between the 0° and 90° positions, the 0° and 180° positions, the 0° and 270° positions, or along the entirety of filter 108).

Figure 6:
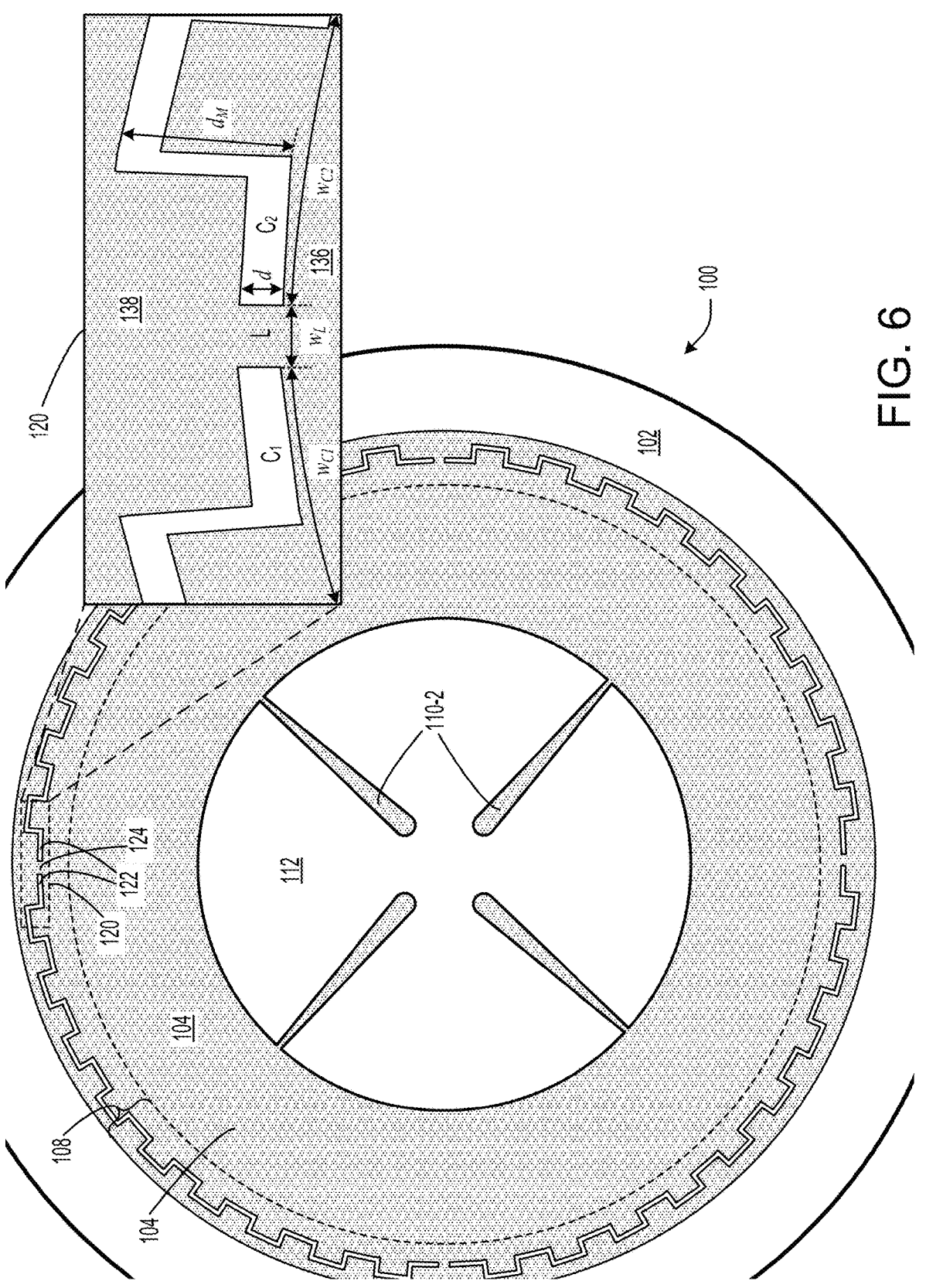
FIG. 6 illustrates a simplified top view of an antenna.

FIG. 6 illustrates a simplified top view of antenna 100, in accordance with some embodiments of the present invention. In the illustrated example, filter 108 includes multiple filter elements 120 that extend between conductive elements 136 and 138 along the entire length of filter 108. Each filter element 120 may include two capacitive elements 122 (e.g., capacitors $C_1$ and $C_2$) in parallel with an inductive element 124 (e.g., inductor L). Alternatively, each filter element 120 may be considered to include a single capacitive element 122 (e.g., capacitor $C_1$) in parallel with an inductive element 124 (e.g., inductor L), such that filter 108 is considered to include four capacitive elements 122 and four inductive elements 124.

Capacitive elements 122 may be formed by spacing conductive element 136 (which may be connected to and/or integrated with outer conductor 104) and conductive element 138 at a distance d apart from each other and over widths $w_{C1}$ and $w_{C2}$, corresponding to capacitors $C_1$ and $C_2$, respectively. Inductive element 124 may be formed by a connection between conductive elements 136 and 138 having a distance d and a width $w_L$, corresponding to inductor L.

In the example shown in FIG. 6, capacitive elements 122 have an increased width due to a meandering distance $d_M$ defined as the distance that the spacing between conductive elements 130 and 132 moves back and forth between inner conductor 106 and outer conductor 104. The meandering pattern shown in FIG. 6 is one example, and other meandering patterns, such as a zig-zag pattern, may similarly be employed to increase the width and accordingly the capacitance values of capacitive elements 122.

Capacitors $C_1$ and $C_2$ may have capacitance values $C_1$ and $C_2$ that are dependent on distance d, meandering distance $d_M$, and widths $w_{C1}$ and $w_{C2}$, respectively, and inductor L may have an inductance value L that is dependent on distance d and width $w_L$. As such, the dimensions d, $d_M$, $w_{C1}$, $w_{C2}$, and $w_L$ can be tuned to obtain a desired resonant frequency $f_R = 1/(2\pi\sqrt{LC})$ where, in some cases, $C = C_1 + C_2$ (or $C = C_1$) or, in some cases, C is a function of $C_1$ and $C_2$. For example, in some cases, increasing distance d may increase inductance value L and decrease capacitance values $C_1$ and $C_2$, increasing $w_{C1}$ and $w_{C2}$ may increase capacitance values $C_1$ and $C_2$, increasing $w_L$ may decrease inductance value L, and increasing $d_M$ may increase capacitance values $C_1$ and $C_2$.

While FIG. 6 shows inductive element 124 as being positioned in the lower radius portion of the meander, in some embodiments inductive element 124 may be positioned in the higher radius portion of the meander and/or between the lower and higher radii portions of the meander along the meandering distance $d_M$.

Figure 7:
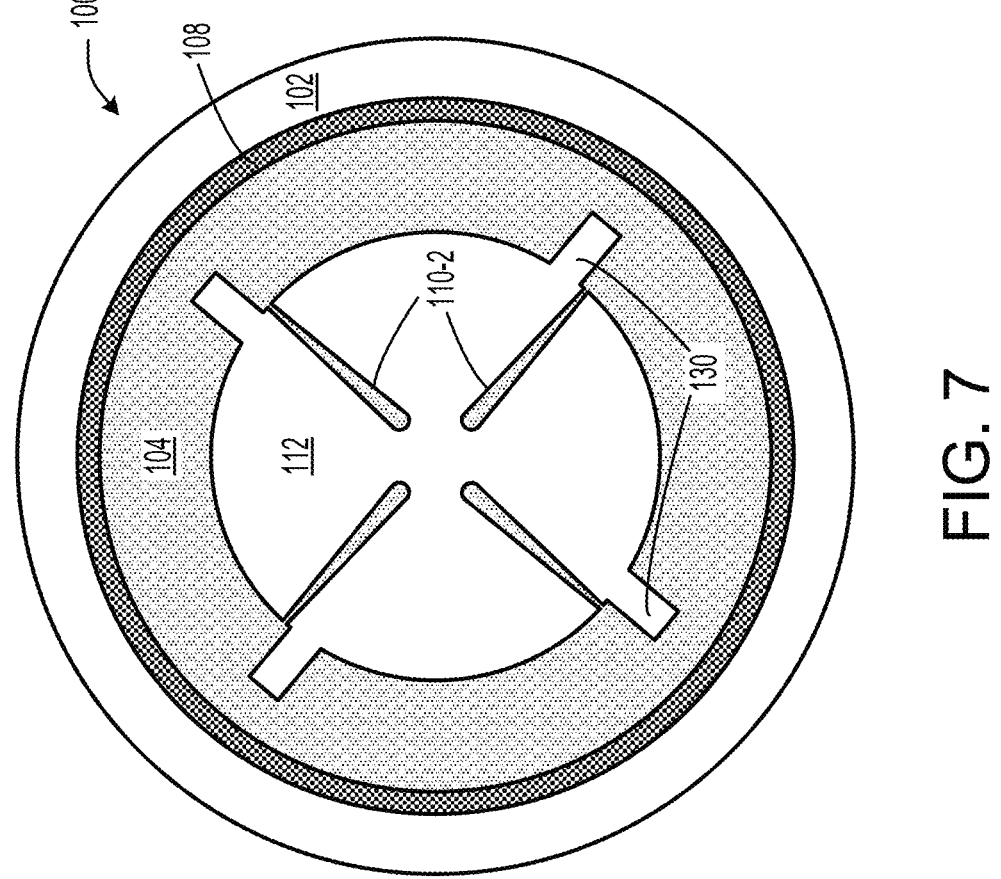
FIG. 7 illustrates a simplified top view of an antenna having a set of notches.

FIG. 7 illustrates a simplified top view of antenna 100 having a set of notches 130, in accordance with some embodiments of the present invention. In some embodiments, outer conductor 104 may include notches 130 or cutouts along the inner edge of outer conductor 104. Notches 130 may serve to increase the length of the path that low-frequency currents travel on outer conductor 104. The size (e.g., length and/or depth) of notches 130 may be adjusted to tune the lower and upper frequency bands. For example, increasing the size of the rectangular shape of notches 130 may cause the frequencies associated with the lower and upper frequency bands to decrease, which may be desirable in many implementations.

Figures 8A, 8B:
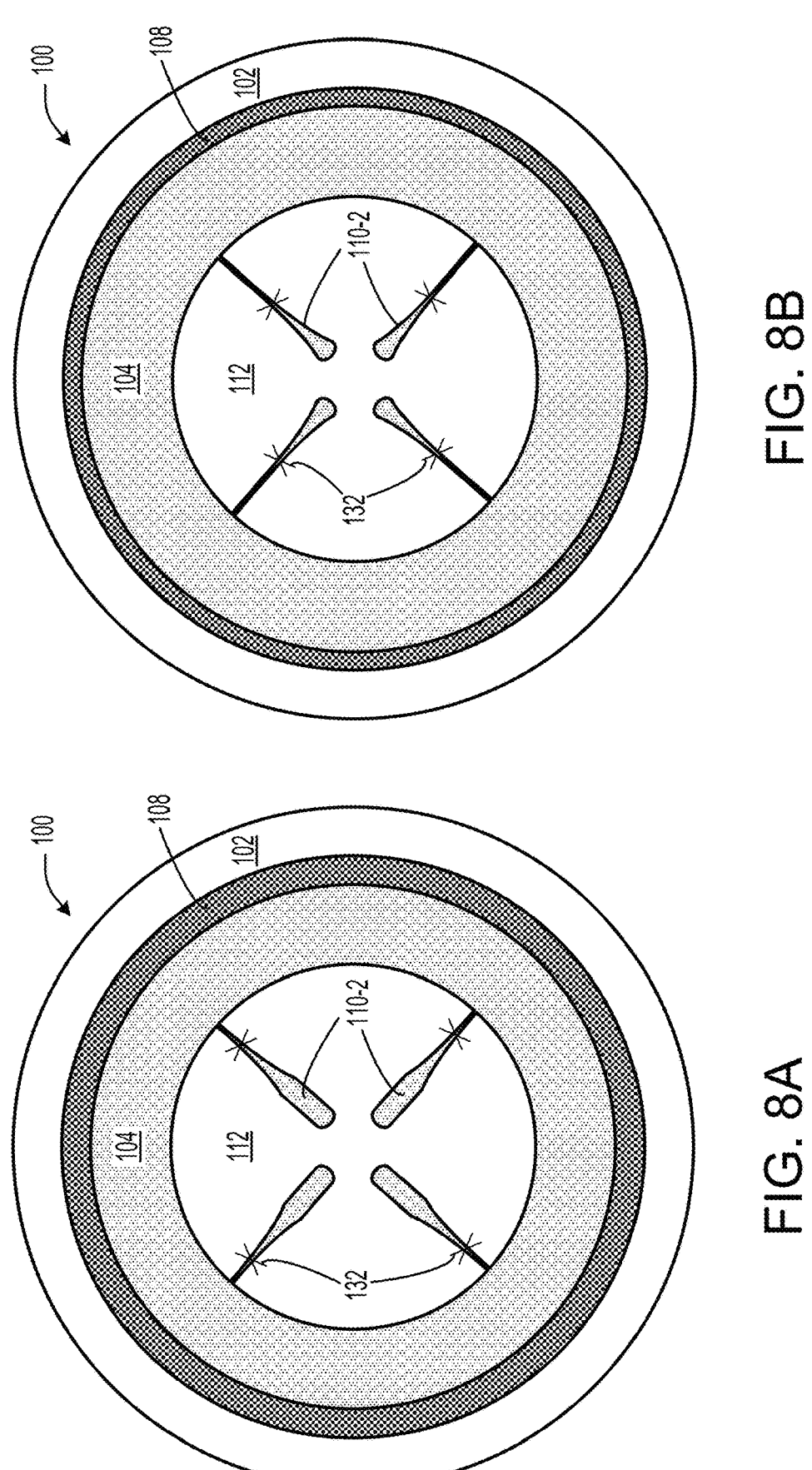
FIG. 8A illustrates a simplified top view of an antenna with high-frequency feed points.
FIG. 8B illustrates a simplified top view of an antenna with high-frequency feed points.

FIGS. 8A and 8B illustrate simplified top views of antenna 100 with different high-frequency feed points 132, in accordance with some embodiments of the present invention. In the illustrated examples, horizontal portions 110-2 are horizontally tapered differently to adjust the locations of high-frequency feed points 132 along inner conductor 106. Horizontal portions 110-2 in FIG. 8A are horizontally tapered more gradually than horizontal portions 110-2 in FIG. 8B, causing high-frequency feed points 132 to be located further outwards in the radial direction.

Figure 9A:
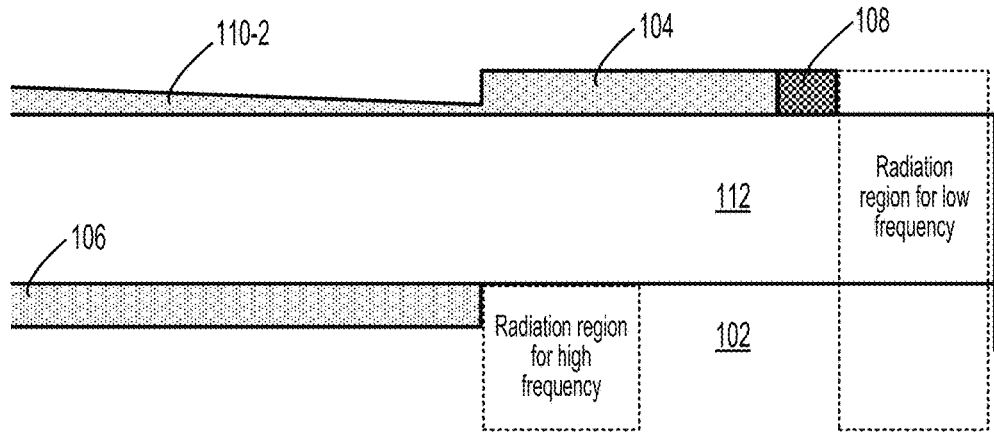
FIG. 9A illustrates a simplified cross section of an antenna.
Figure 9B:
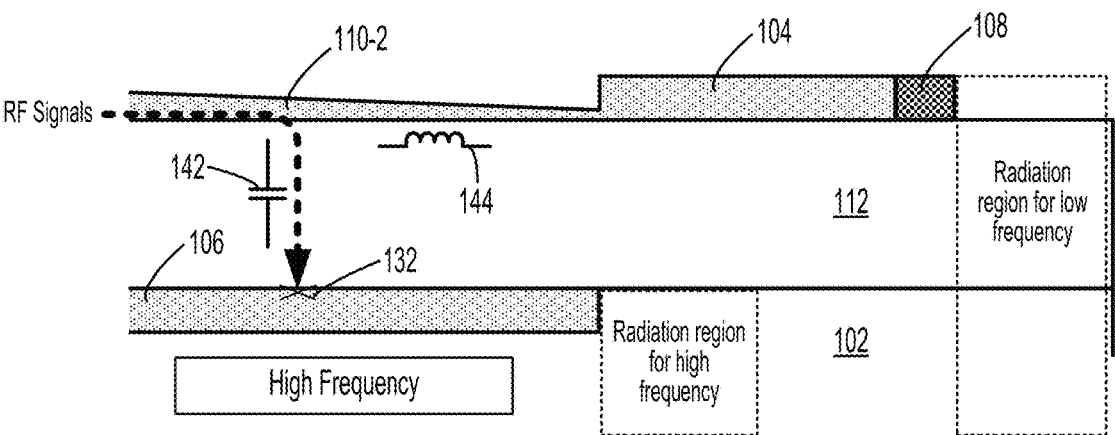
FIG. 9B illustrates a simplified cross section of an antenna.
Figure 9C:
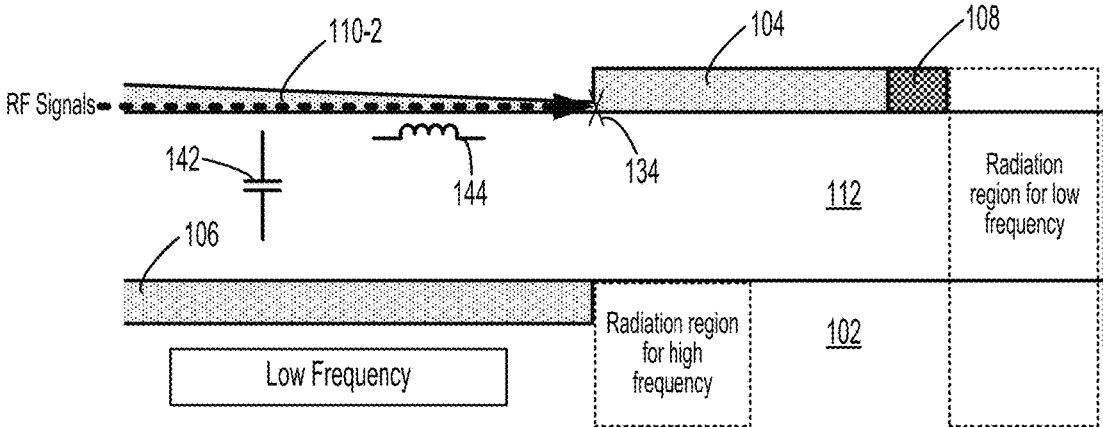
FIG. 9C illustrates a simplified cross section of an antenna.
Figure 9D:
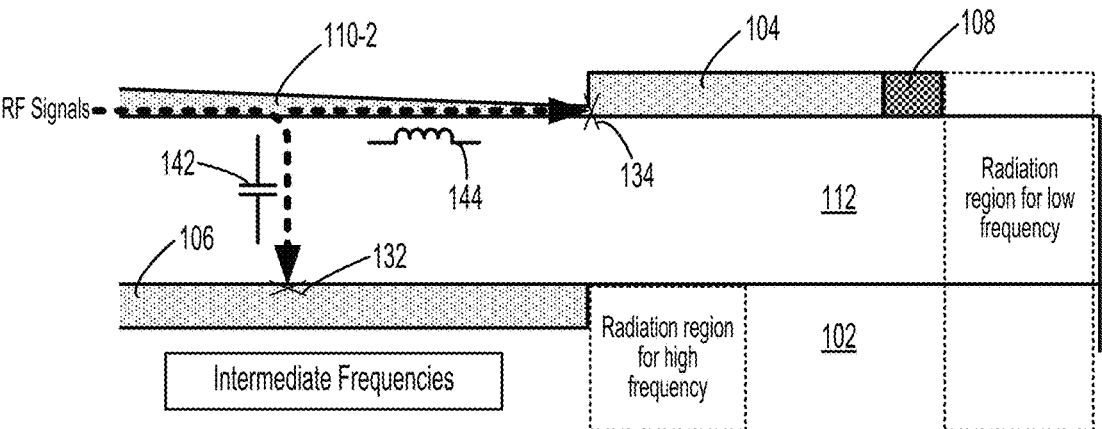
FIG. 9D illustrates a simplified cross section of an antenna.

FIGS. 9A-9D illustrate simplified cross sections of antenna 100, in accordance with some embodiments of the present invention. FIGS. 9B-9D illustrate the behavior of antenna 100 at three different frequencies. In all three cases, electromagnetic waves (e.g., RF signals) propagating down horizontal portions 110-2 of the feeds see a capacitance 142 between horizontal portions 110-2 and inner conductor 106 as well as an inductance 144 as the feeds are gradually tapered. The capacitance is proportional to the width of horizontal portions 110-2 and the inductance increases as the width of horizontal portions 110-2 becomes smaller.

FIG. 9B illustrates the behavior of antenna 100 at the upper frequency band. As a high-frequency RF signal travels along horizontal portion 110-2 in the outward radial direction, the RF signal encounters an increasing inductive impedance, and at high-frequency feed point 132, the capacitive impedance to inner conductor 106 becomes smaller than the impedance of horizontal portion 110-2. Since the high-frequency RF signal chooses the easiest path, the RF signal couples to inner conductor 106 and the low-frequency patch by crossing spacing layer 112. The RF signal then travels along inner conductor 106 and radiates at the outer edge of inner conductor 106.

FIG. 9C illustrates the behavior of antenna 100 at the lower frequency band. As a low-frequency RF signal travels along horizontal portion 110-2 in the outward radial direction, the RF signal encounters an increasing inductive impedance. However, at the low-frequency band, the capacitive impedance to inner conductor 106 remains greater than the inductive impedance. Since the low-frequency RF signal chooses the easiest path, the RF signal couples to outer conductor 104 and the low-frequency patch. The RF signal then travels along outer conductor 104 and radiates at the outer edge of outer conductor 108. The impedance of filter 108 is low at the lower frequency band and therefore does not disrupt the above-described steps. At the lower frequency band, inner conductor 106 behaves as a ground plane for the microstrip-like feed trace of horizontal portion 110-2.

FIG. 9D illustrates the behavior of antenna 100 at intermediate frequencies between the lower and upper frequency bands. As an intermediate-frequency RF signal travels along horizontal portion 110-2 in the outward radial direction, the RF signal encounters an inductive impedance that is roughly equal to the capacitive impedance to inner conductor 106. As such, the intermediate-frequency RF signal couples to both inner conductor 106 and outer conductor 104. The RF signal then travels along inner conductor 106 and outer conductor 104 and radiates at the outer edge of each in the absence of filter 108. While both patches are inefficient radiators at the intermediate frequencies, the contribution of each patch can add up to significant radiation. With the addition of the filter 108, the intermediate-frequency RF signal couples to only the inner conductor 106, resulting in a low antenna gain at the intermediate frequencies.

Therefore, it may be desirable to tune filter 108 to have a large impedance at the intermediate frequencies to disrupt the radiation at the edge of outer conductor 104. For example, at the resonant frequency, the impedance of filter 108, which includes the parallel circuit including a capacitive element 122 and inductive element 124, is real and is approximately infinity. For electromagnetic waves, filter 108 behaves like a wall and the electromagnetic waves propagating toward filter 108 from feed 110 are fully reflected back toward feed 110. Since the impedance is real, the result is an in phase total reflection with a standing wave and no radiation at the resonant frequency.

Figure 10A:
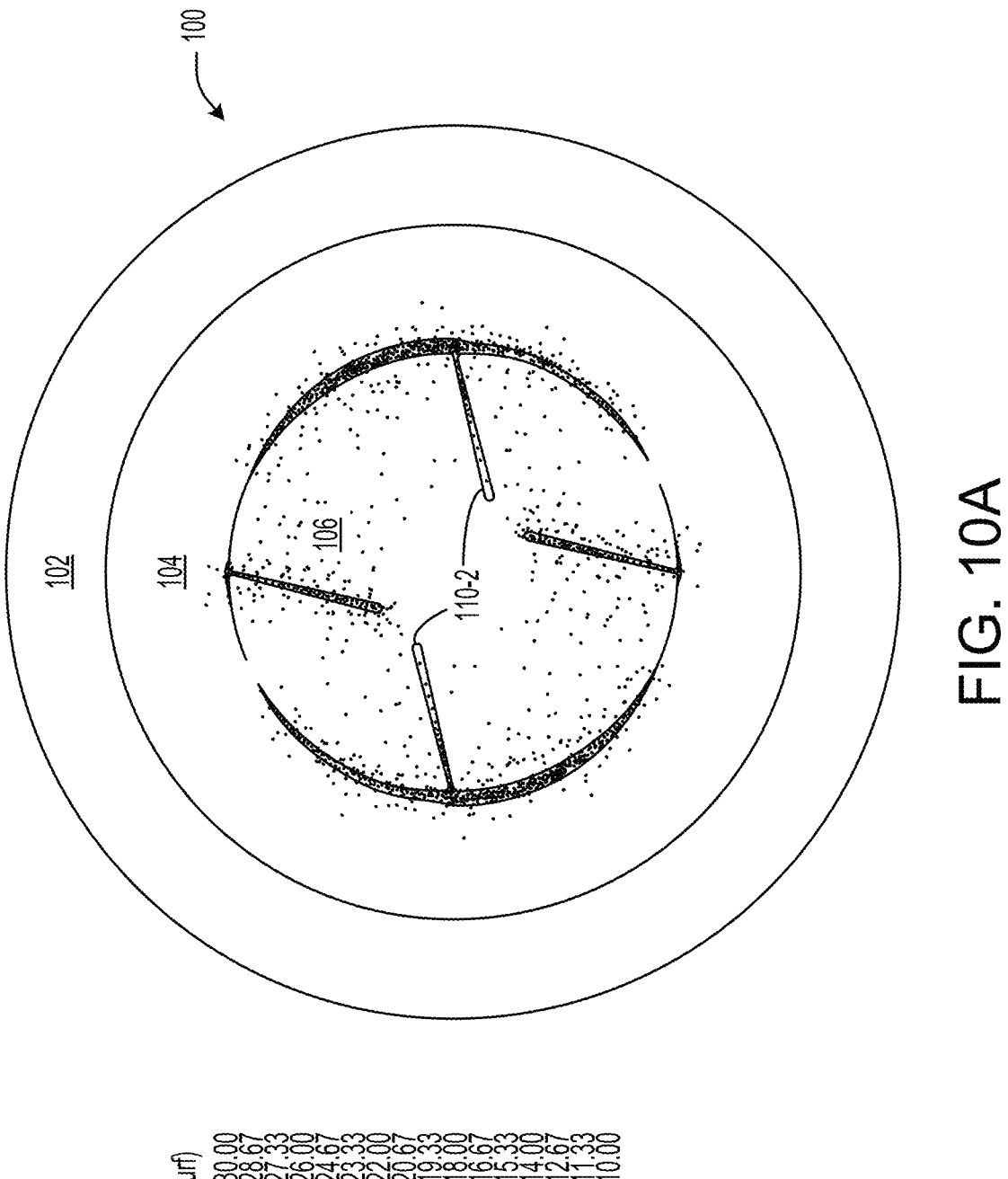
FIG. 10A illustrates a simplified top view of an antenna showing simulation results.
Figure 10B:
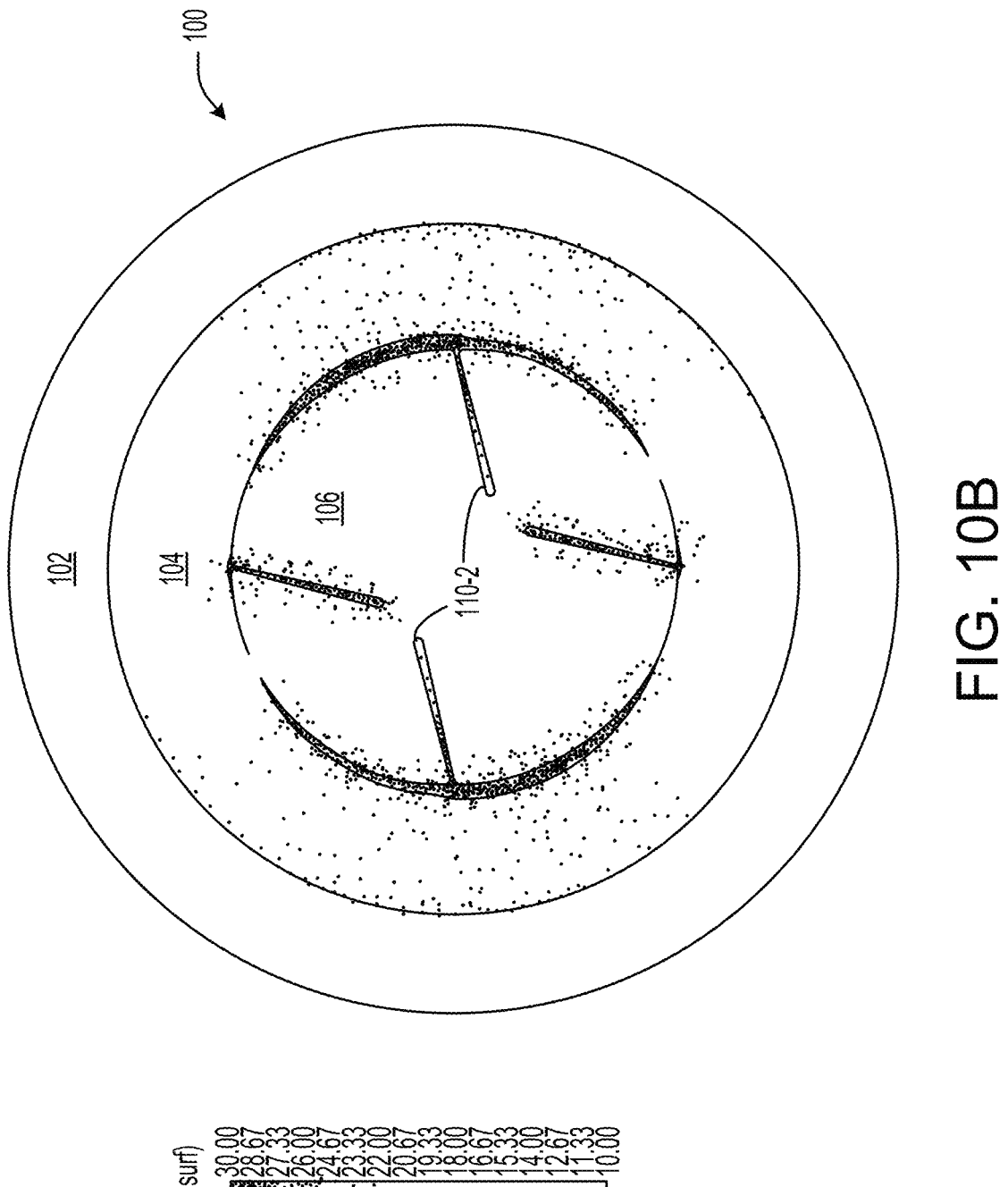
FIG. 10B illustrates a simplified top view of an antenna showing simulation results.
Figure 10C:
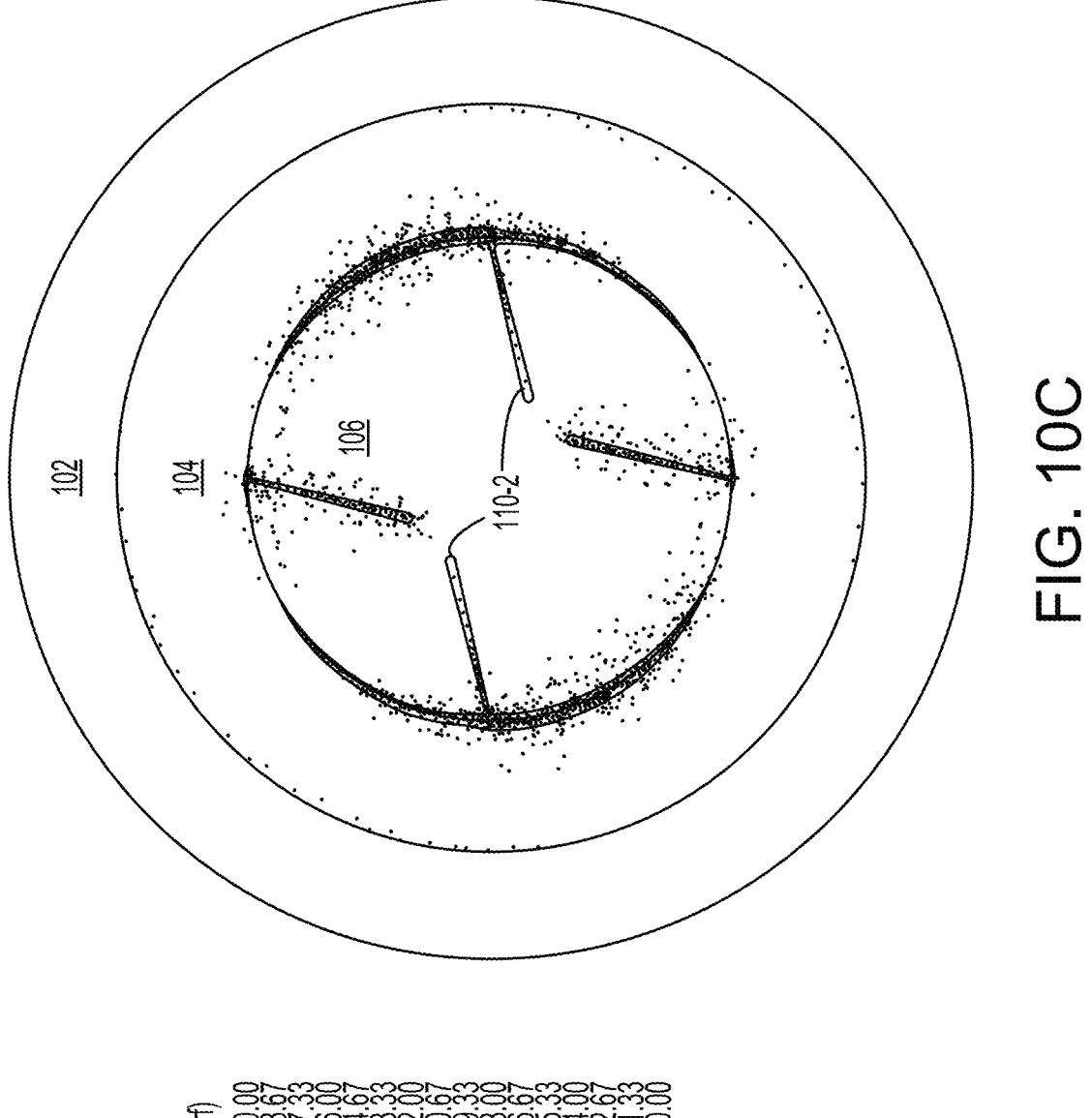
FIG. 10C illustrates a simplified top view of an antenna showing simulation results.

FIGS. 10A-10C illustrate simplified top views of antenna 100 showing simulation results in the absence of filter 108, in accordance with some embodiments of the present invention. FIG. 10A illustrates simulation results at the upper frequency band, FIG. 10B illustrates simulation results at the lower frequency band, and FIG. 10C illustrates simulation results at the intermediate frequency band.

In FIG. 10A, which corresponds to the upper frequency band, it can be observed that there are only small surface currents on outer conductor 104 and the low-frequency patch, with most of the current on inner conductor 106 and the high-frequency patch. Most of the radiation occurs at the edge of the high-frequency patch. It should be noted that there are only negligible currents at the center point of inner conductor 106. As such, this area may serve as a virtual ground.

In FIG. 10B, which corresponds to the lower frequency band, it can be observed that there are strong surface currents on outer conductor 104 and the low-frequency patch, and small currents on inner conductor 106 and the high-frequency patch. Most of the radiation occurs at the edge of the low-frequency patch. Due to the small currents on inner conductor 106, it behaves as a virtual ground for the feeds.

In FIG. 10C, which corresponds to the intermediate frequencies, it can be observed that there are surface currents on both outer conductor 104 and the low-frequency patch as well as inner conductor 106 and the high-frequency patch.

Figure 11:
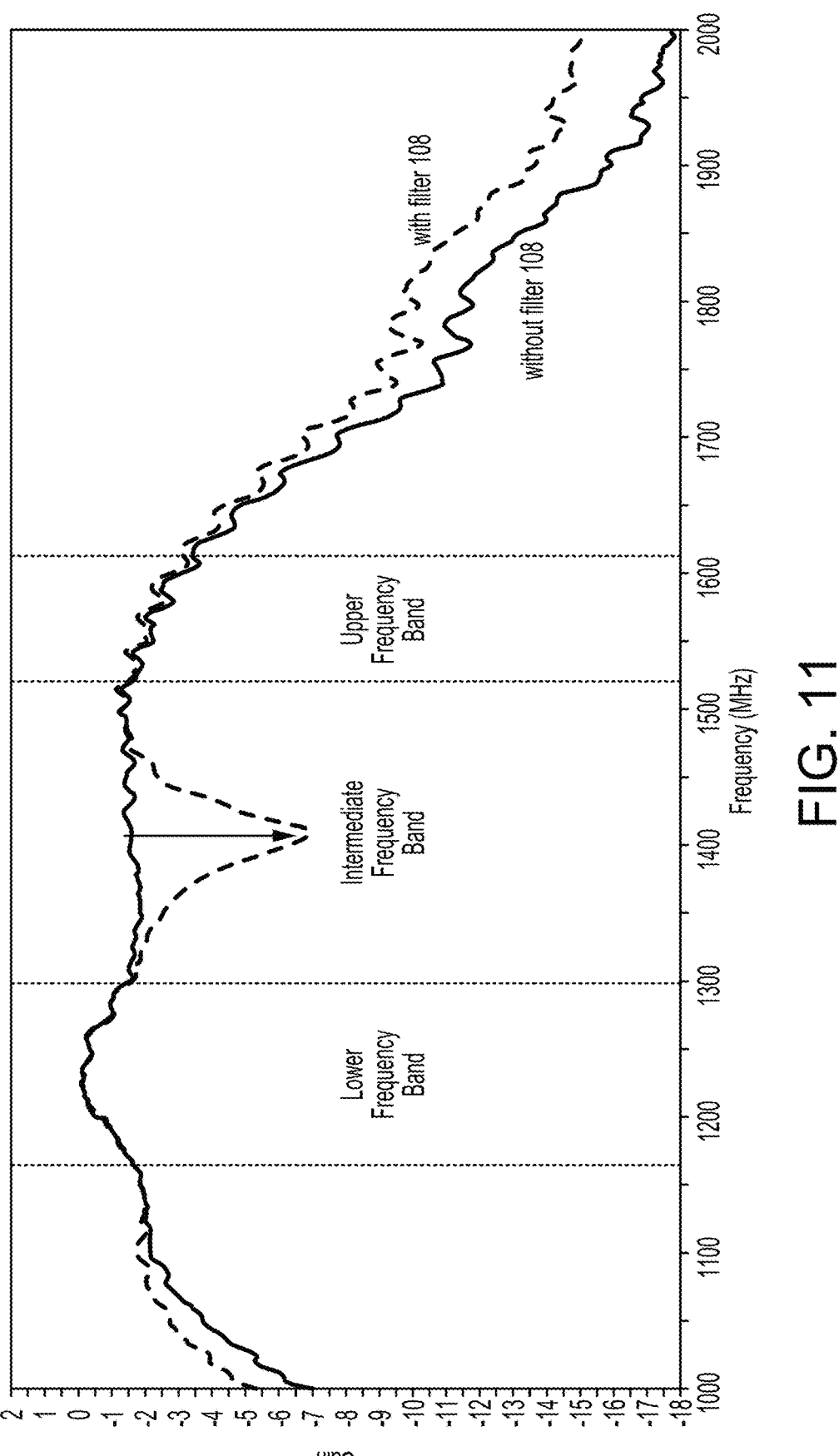
FIG. 11 illustrates results for the measured uncalibrated antenna gain versus frequency for an antenna.

FIG. 11 illustrates results for the measured antenna gain versus frequency for antenna 100, in accordance with some embodiments of the present invention. Specifically, FIG. 11 shows normalized uncalibrated antenna gain as a function of frequency for antenna 100, with the dashed line corresponding to antenna 100 with filter 108 and the solid line corresponding to antenna 100 without filter 108. As can be observed, the gain of the antenna decreases significantly in the intermediate frequencies when antenna 100 includes filter 108.

Figure 12:
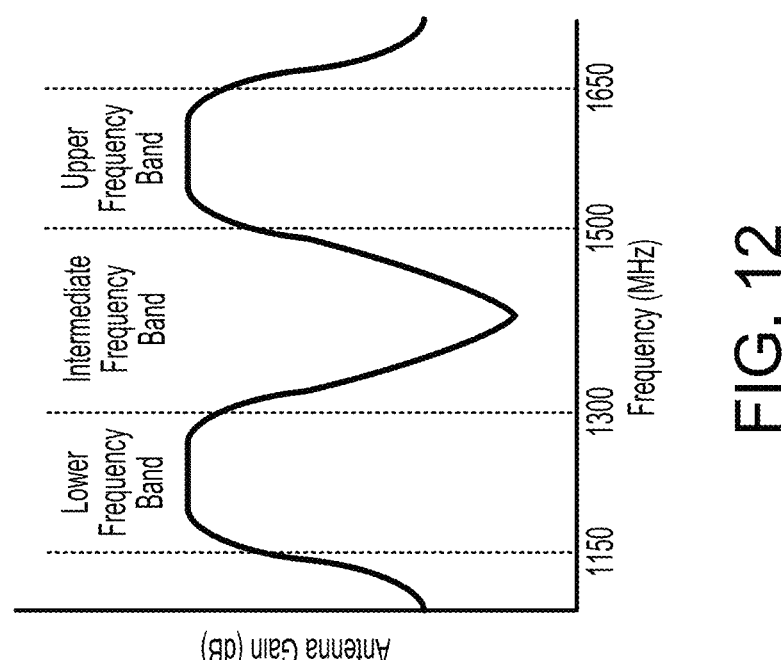
FIG. 12 illustrates a plot showing an example antenna gain of an antenna as a function of frequency.

FIG. 12 illustrates a plot showing an example antenna gain of antenna 100 as a function of frequency, in accordance with some embodiments of the present invention. In the illustrated example, the antenna gain is high in each of the lower and upper frequency bands and is low outside these bands. As such, antenna 100 can be receptive to radio waves having frequencies in the lower and upper frequency bands while rejecting radio waves having frequencies outside these bands.

Figure 13B:
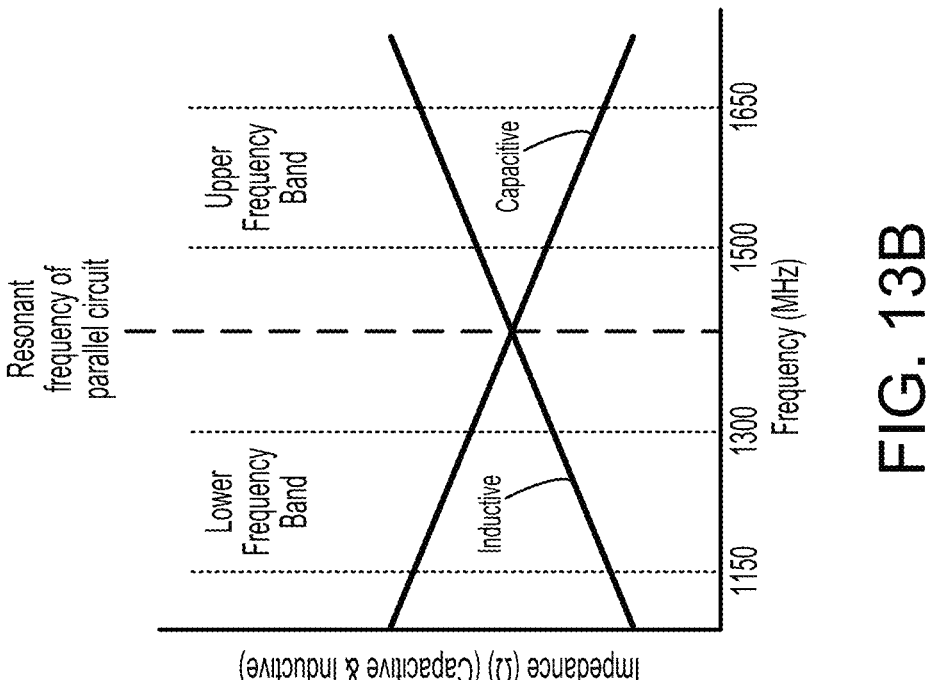
FIG. 13B illustrates a plot showing an example impedance of a filter as a function of frequency.
Figure 13A:
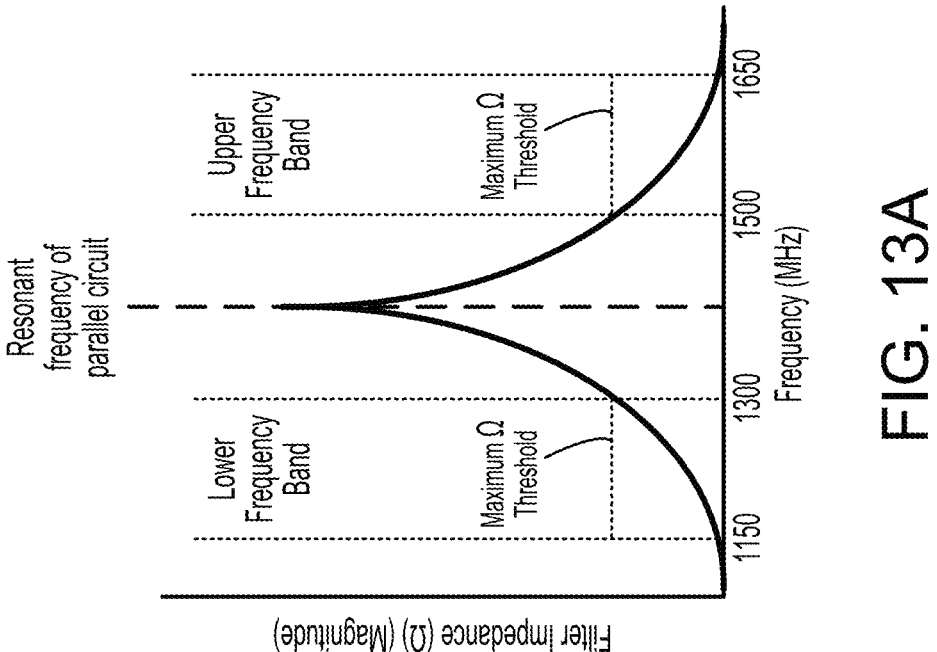
FIG. 13A illustrates a plot showing an example impedance of a filter as a function of frequency.

FIGS. 13A and 13B illustrate plots showing an example impedance of filter 108 as a function of frequency, in accordance with some embodiments of the present invention. A magnitude of the impedance is shown in FIG. 13A and the impedances of the capacitive and inductive elements of filter 108 are shown in FIG. 13B. In the illustrated example, filter 108 is tuned to obtain a desired impedance response that includes an impedance that (1) is more inductive than capacitive in the lower frequency band (e.g., the impedance of the inductive element is less than the impedance of the capacitive element), (2) is more capacitive than inductive in the upper frequency band (e.g., the impedance of the capacitive element is less than the impedance of the inductive element), and (3) has a magnitude that is less than a maximum impedance threshold in both the lower and upper frequency bands.

As described above, filter 108 may include one or more filter elements each comprising a parallel circuit including at least one capacitive element and at least one inductive element, and the filter element may be tuned such that the resonant frequency is between the lower and upper frequency bands. In the illustrated example, the resonant frequency is set to the midpoint between the lower and upper frequency bands (e.g., 1400 MHz) so that the magnitude of the impedance drops below the maximum impedance threshold at the lower and upper bands. At or near the resonant frequency, when the impedance of filter 108 is significantly resistive and higher than the maximum impedance threshold, a significant portion of the electrical signals reflect from the filter boundary, resulting in a standing wave behavior on outer conductor 104, and hence very little radiation/reception and antenna gain.

FIG. 13B shows the variation of the impedances of the capacitive and inductive elements by frequency. The resonance occurs when these impedances are equal, resulting in a substantial resistance. At or near the resonant frequency, this substantial resistance causes significant reflections at filter 108, preventing antenna radiation and causing gain fluctuations. For proper antenna operation in the desired bands, the filter resonant frequency is to be placed in the middle of the two bands such that the impedance of filter 108 remains below the maximum impedance threshold and such that large reflections are avoided. In the lower frequency band, the impedance of the inductive element is much lower than the impedance of the capacitive element, causing the electrical signals, which choose the path of least resistance, to travel from the inner conductor to the outer conductor through the inductive element (e.g., the metal bridge connecting the inner conductor to the outer conductor). In the upper frequency band, the impedance of the capacitive element is much lower than the impedance of the inductive element, thus, the electrical signals travel towards the capacitive element (e.g., the gap in between the inner and outer conductors) rather than the inductive element. If the gap is located at a radial distance to support efficient electromagnetic radiation in the upper frequency band, the high-frequency signals can radiate through this gap before reaching the outer conductor. Otherwise, they are reflected back towards the feeds.

Since the current chooses the easiest path in the parallel circuit, the smaller impedance dominates the impedance of the parallel circuit. As such, the impedance of filter 108 is considered to be more inductive than capacitive at the lower frequency band (since the smaller inductive impedance dominates) and more capacitive than inductive at the upper frequency band (since the smaller capacitive impedance dominates).

Figure 14:
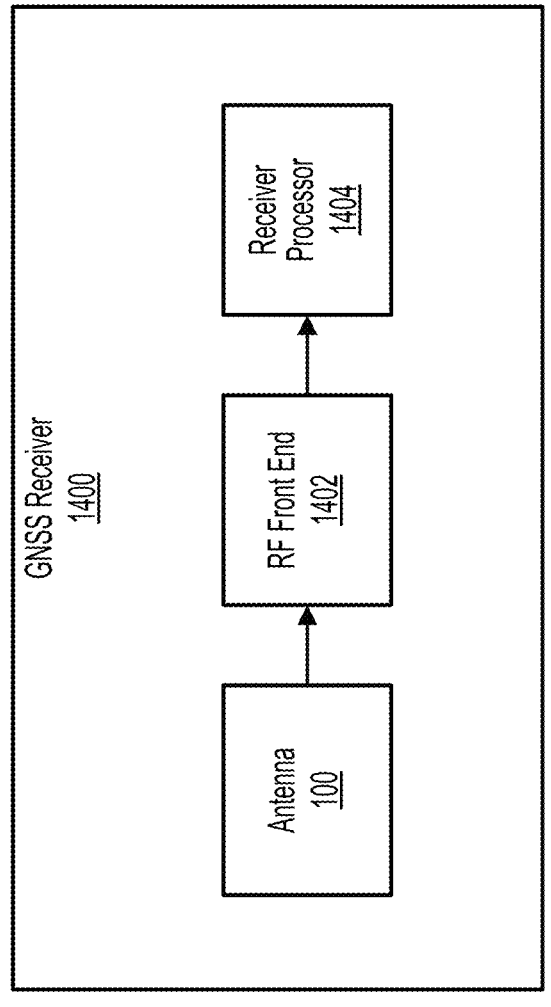
FIG. 14 illustrates an example block diagram of a GNSS receiver.

FIG. 14 illustrates an example block diagram of a GNSS receiver 1400, in accordance with some embodiments of the present invention. GNSS receiver 1400 includes antenna 100 for receiving wireless signals and sending/routing the wireless signals to an RF front end 1402. RF front ends are well known in the art, and in some instances include a band-pass filter for initially filtering out undesirable frequency components outside the frequencies of interest, a low-noise amplifier (LNA) for amplifying the received signal, a local oscillator and a mixer for down converting the received signal from RF to intermediate frequencies (IF), a band-pass filter for removing frequency components outside IF, and an analog-to-digital (A/D) converter for sampling the received signal to generate digital samples. In some embodiments, portions of the RF front end, such as the LNA and the RF filters, can be implemented as a PCB that includes ground plane 116.

Digital samples generated by RF front end 1402 may be sent to a receiver processor 1404, which may process the digital samples to generate pseudoranges and/or position estimates corresponding to GNSS receiver 1400. In some instances, a correlator may be employed between RF front end 1402 and receiver processor 1404 that performs correlations on the digital samples using local codes. The correlator may generate correlation results based on the digital samples and send those results to receiver processor 1404. In some embodiments, the correlator is a specific piece of hardware, such as an application-specific integrated circuit (ASIC) or a field-programmable gate array (FPGA). In some embodiments, the operations performed by the correlator are performed in software using digital signal processing (DSP) techniques.

Based on multiple pseudoranges calculated using different received wireless signals from different GNSS satellites, receiver processor 1404 may generate and output position data comprising a plurality of GNSS points. Each of the plurality of GNSS points may be a 3D coordinate represented by three numbers. In some embodiments, the three numbers may correspond to latitude, longitude, and elevation/altitude. In other embodiments, the three numbers may correspond to X, Y, and Z positions. The position data may be outputted to be displayed to a user, transmitted to a separate device (e.g., computer, smartphone, server, etc.) via a wired or wireless connection, or further processed, among other possibilities.

Figure 15:
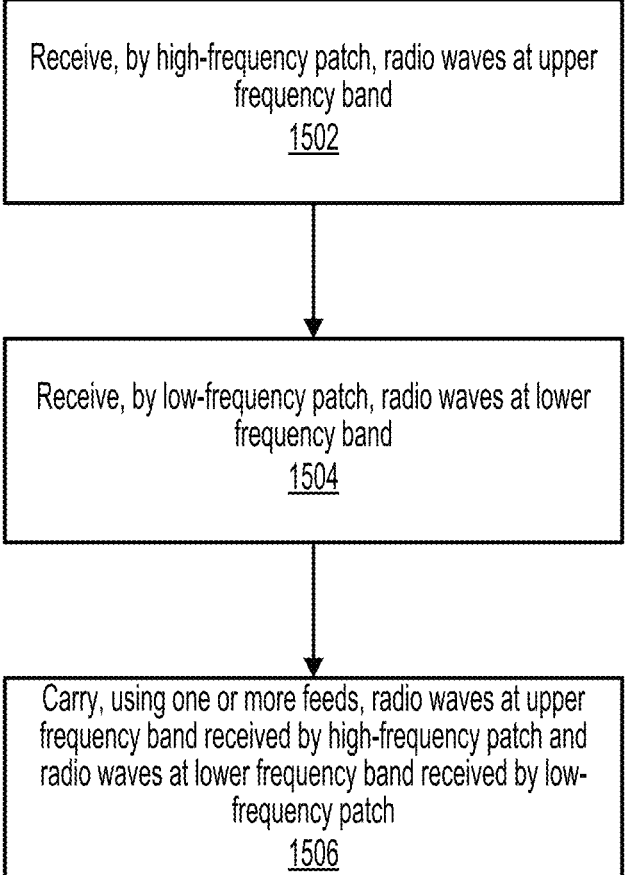
FIG. 15 illustrates a method of receiving radio waves by an antenna.
Figure 15:

FIG. 15 illustrates a method 1500 of receiving radio waves by an antenna (e.g., antenna 100), in accordance with some embodiments of the present invention. One or more steps of method 1500 may be omitted during performance of method 1500, and steps of method 1500 need not be performed in the order shown. In some instances, one or more steps of method 1500 may be facilitated by one or more processors. In some instances, method 1500 may be implemented as a computer-readable medium or computer program product comprising instructions which, when the program is executed by one or more computers, cause the one or more computers to carry out the steps of method 1500.

At step 1502, radio waves at an upper frequency band are received by a high-frequency patch (e.g., high-frequency patch 126) of the antenna. The high-frequency patch may be formed by an inner conductor (e.g., inner conductor 106) overlaying a dielectric layer (e.g., dielectric layer 102) and disposed above a ground plane (e.g., ground plane 116) of the antenna. The inner conductor may have at least one feed hole (e.g., feed hole(s) 114).

At step 1504, radio waves at a lower frequency band are received by a low-frequency patch (e.g., low-frequency patch 128) of the antenna. The low-frequency patch may be formed by an outer conductor (e.g., outer conductor 104) overlaying a spacing layer (e.g., spacing layer 112) and surrounding the inner conductor. A filter (e.g., filter 108) may be disposed along an outer edge of the outer conductor. The filter may at least partially block electrical signals at the intermediate frequency band and let pass electrical signals at the lower GNSS frequency band. The filter may include at least one capacitive element and at least one inductive element.

At step 1506, the radio waves at the upper frequency band received by the high-frequency patch and the radio waves at the lower frequency band received by the low-frequency patch are carried using one or more feeds (e.g., feeds 110) that are conductively connected to the outer conductor and are parasitically coupled to the inner conductor. Each of the one or more feeds may include a vertical portion that passes through one of the at least one feed hole. These received radio waves may be carried to an RF front end (e.g., RF front end 1402), which may generate digital samples that are sent to a processor (e.g., receiver processor 1404).

Figure 16:
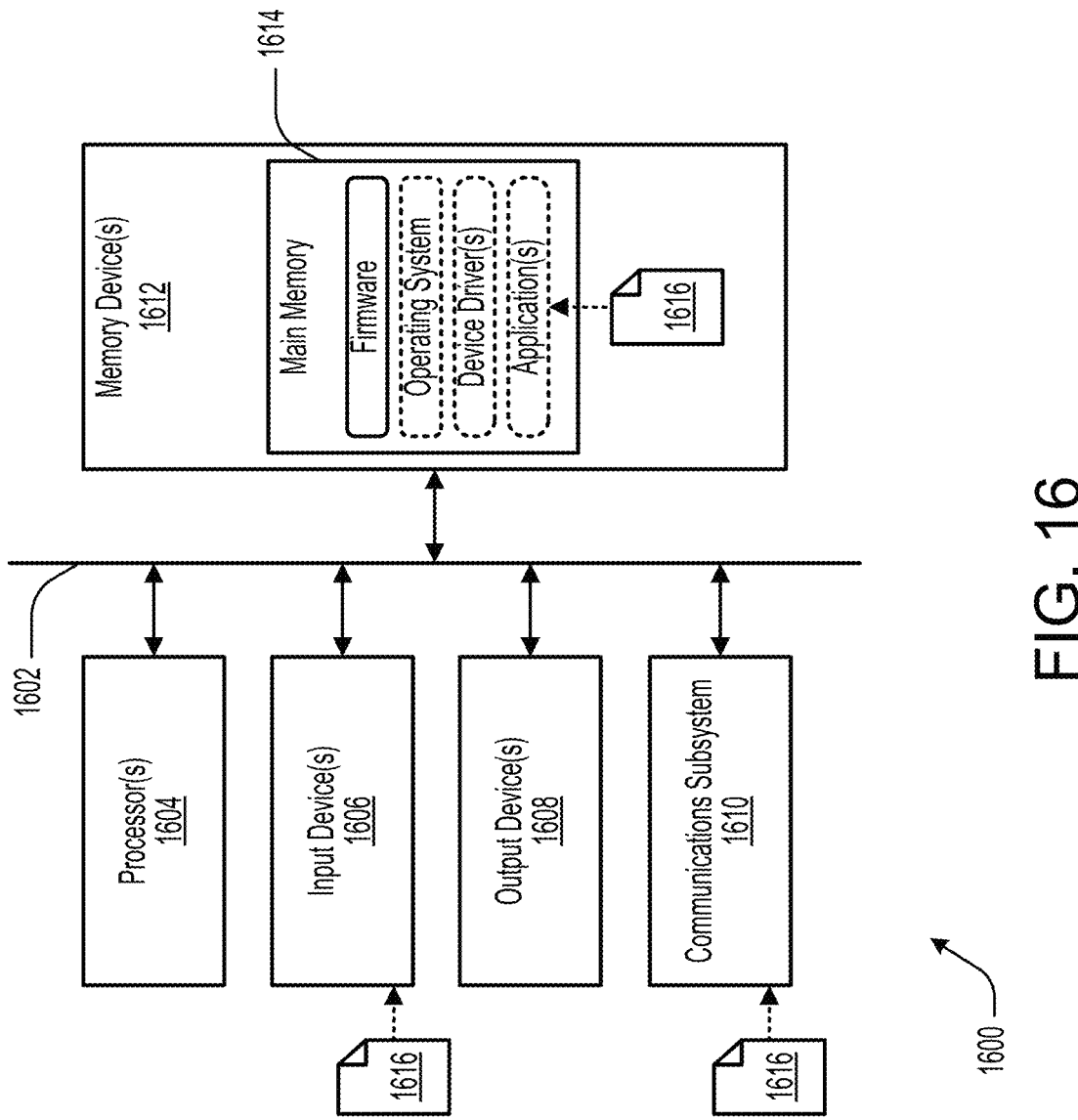
FIG. 16 illustrates an example computer system comprising various hardware elements.

FIG. 16 illustrates an example computer system 1600 comprising various hardware elements, according to some embodiments of the present disclosure. Computer system 1600 may be incorporated into or integrated with devices described herein and/or may be configured to perform some or all of the steps of the methods provided by various embodiments. For example, in various embodiments, computer system 1600 may be incorporated into receiver processor 1404 and/or may be configured to perform method 1500. It should be noted that FIG. 16 is meant only to provide a generalized illustration of various components, any or all of which may be utilized as appropriate. FIG. 16, therefore, broadly illustrates how individual system elements may be implemented in a relatively separated or relatively more integrated manner.

In the illustrated example, computer system 1600 includes a communication medium 1602, one or more processor(s) 1604, one or more input device(s) 1606, one or more output device(s) 1608, a communications subsystem 1610, and one or more memory device(s) 1612. Computer system 1600 may be implemented using various hardware implementations and embedded system technologies. For example, one or more elements of computer system 1600 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 1600 may be coupled via communication medium 1602. While communication medium 1602 is illustrated as a single connection for purposes of clarity, it should be understood that communication medium 1602 may include various numbers and types of communication media for transferring data between hardware elements. For example, communication medium 1602 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 1602 may include one or more buses connecting pins of the hardware elements of computer system 1600. For example, communication medium 1602 may include a bus connecting processor(s) 1604 with main memory 1614, referred to as a system bus, and a bus connecting main memory 1614 with input device(s) 1606 or output device(s) 1608, referred to as an expansion bus. The system bus may consist of several elements, including an address bus, a data bus, and a control bus. The address bus may carry a memory address from processor(s) 1604 to the address bus circuitry associated with main memory 1614 in order for the data bus to access and carry the data contained at the memory address back to processor(s) 1604. The control bus may carry commands from processor(s) 1604 and return status signals from main memory 1614. Each bus may include multiple wires for carrying multiple bits of information and each bus may support serial or parallel transmission of data.

Processor(s) 1604 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 1604 may include one or more multi-core processors, in which each core may read and execute program instructions simultaneously with the other cores.

Input device(s) 1606 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 1606 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 1608 may include one or more of various devices that convert information into human-readable form, such as without limitation a display device, a speaker, a printer, and/or the like. Output device(s) 1608 may also include devices for writing to removable storage devices or other removable media, such as those described in reference to input device(s) 1606. Output device(s) 1608 may also include various actuators for causing physical movement of one or more components. Such actuators may be hydraulic, pneumatic, electric, and may be provided with control signals by computer system 1600.

Communications subsystem 1610 may include hardware components for connecting computer system 1600 to systems or devices that are located external computer system 1600, such as over a computer network. In various embodiments, communications subsystem 1610 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 1612 may include the various data storage devices of computer system 1600. For example, memory device(s) 1612 may include various types of computer memory with various response times and capacities, from faster response times and lower capacity memory, such as processor registers and caches (e.g., L0, L1, L2), to medium response time and medium capacity memory, such as random access memory, to lower response times and lower capacity memory, such as solid state drives and hard drive disks. While processor(s) 1604 and memory device(s) 1612 are illustrated as being separate elements, it should be understood that processor(s) 1604 may include varying levels of on-processor memory, such as processor registers and caches that may be utilized by a single processor or shared between multiple processors.

Memory device(s) 1612 may include main memory 1614, which may be directly accessible by processor(s) 1604 via the memory bus of communication medium 1602. For example, processor(s) 1604 may continuously read and execute instructions stored in main memory 1614. As such, various software elements may be loaded into main memory 1614 to be read and executed by processor(s) 1604 as illustrated in FIG. 16. Typically, main memory 1614 is volatile memory, which loses all data when power is turned off and accordingly needs power to preserve stored data. Main memory 1614 may further include a small portion of non-volatile memory containing software (e.g., firmware, such as BIOS) that is used for reading other software stored in memory device(s) 1612 into main memory 1614. In some embodiments, the volatile memory of main memory 1614 is implemented as random-access memory (RAM), such as dynamic RAM (DRAM), and the non-volatile memory of main memory 1614 is implemented as read-only memory (ROM), such as flash memory, erasable programmable read-only memory (EPROM), or electrically erasable programmable read-only memory (EEPROM).

Computer system 1600 may include software elements, shown as being currently located within main memory 1614, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 1616, executable by computer system 1600. In one example, such instructions 1616 may be received by computer system 1600 using communications subsystem 1610 (e.g., via a wireless or wired signal carrying instructions 1616), carried by communication medium 1602 to memory device(s) 1612, stored within memory device(s) 1612, read into main memory 1614, and executed by processor(s) 1604 to perform one or more steps of the described methods. In another example, instructions 1616 may be received by computer system 1600 using input device(s) 1606 (e.g., via a reader for removable media), carried by communication medium 1602 to memory device(s) 1612, stored within memory device(s) 1612, read into main memory 1614, and executed by processor(s) 1604 to perform one or more steps of the described methods.

In some embodiments of the present disclosure, instructions 1616 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 1600. For example, the non-transitory computer-readable medium may be one of memory device(s) 1612, as shown in FIG. 16, with instructions 1616 being stored within memory device(s) 1612. In some cases, the non-transitory computer-readable medium may be separate from computer system 1600. In one example, the non-transitory computer-readable medium may be a removable media provided to input device(s) 1606, such as those described in reference to input device(s) 1606, as shown in FIG. 16, with instructions 1616 being provided to input device(s) 1606. In another example, the non-transitory computer-readable medium may be a component of a remote electronic device, such as a mobile phone, that may wirelessly transmit a data signal carrying instructions 1616 to computer system 1600 using communications subsystem 1616, as shown in FIG. 16, with instructions 1616 being provided to communications subsystem 1610.

Instructions 1616 may take any suitable form to be read and/or executed by computer system 1600. For example, instructions 1616 may be source code (written in a human-readable programming language such as Java, C, C++, C#, Python), object code, assembly language, machine code, microcode, executable code, and/or the like. In one example, instructions 1616 are provided to computer system 1600 in the form of source code, and a compiler is used to translate instructions 1616 from source code to machine code, which may then be read into main memory 1614 for execution by processor(s) 1604. As another example, instructions 1616 are provided to computer system 1600 in the form of an executable file with machine code that may immediately be read into main memory 1614 for execution by processor(s) 1604. In various examples, instructions 1616 may be provided to computer system 1600 in encrypted or unencrypted form, compressed or uncompressed form, as an installation package or an initialization for a broader software deployment, among other possibilities.

In one aspect of the present disclosure, a system (e.g., computer system 1600) is provided to perform methods in accordance with various embodiments of the present disclosure. For example, some embodiments may include a system comprising one or more processors (e.g., processor(s) 1604) that are communicatively coupled to a non-transitory computer-readable medium (e.g., memory device(s) 1612 or main memory 1614). The non-transitory computer-readable medium may have instructions (e.g., instructions 1616) stored therein that, when executed by the one or more processors, cause the one or more processors to perform the methods described in the various embodiments.

In another aspect of the present disclosure, a computer-program product that includes instructions (e.g., instructions 1616) is provided to perform methods in accordance with various embodiments of the present disclosure. The computer-program product may be tangibly embodied in a non-transitory computer-readable medium (e.g., memory device(s) 1612 or main memory 1614). The instructions may be configured to cause one or more processors (e.g., processor(s) 1604) to perform the methods described in the various embodiments.

In another aspect of the present disclosure, a non-transitory computer-readable medium (e.g., memory device(s) 1612 or main memory 1614) is provided. The non-transitory computer-readable medium may have instructions (e.g., instructions 1616) stored therein that, when executed by one or more processors (e.g., processor(s) 1604), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An antenna structure comprising:
   an inner conductor having one or more feed holes, the inner conductor forming a high-frequency patch operable to receive radio waves at an upper frequency band;
   an outer conductor surrounding the inner conductor in a radial direction, the outer conductor forming a low-frequency patch operable to receive radio waves at a lower frequency band; and
   one or more feeds that respectively pass through one of the one or more feed holes in a vertical direction, the one or more feeds each including a horizontal portion that extends in an outward radial direction from the one or more feed holes toward the outer conductor and is conductively connected to the outer conductor, wherein the horizontal portion of each of the one or more feeds is tapered in the outward radial direction.

2. The antenna structure of claim 1, further comprising:
   a ground plane disposed below the inner conductor and the outer conductor, wherein the ground plane is electrically conducting.

3. The antenna structure of claim 2, further comprising:
   a dielectric layer disposed between the ground plane and the inner conductor, wherein the dielectric layer is electrically insulating.

4. The antenna structure of claim 3, wherein the one or more feeds extend through the dielectric layer.

5. The antenna structure of claim 1, wherein the outer conductor is vertically offset from the inner conductor.

6. The antenna structure of claim 5, further comprising:
   a spacing layer disposed between the inner conductor and the outer conductor, wherein the spacing layer is electrically insulating.

7. The antenna structure of claim 1, further comprising:
   a filter disposed along an outer edge of the outer conductor, the filter being configured to at least partially block electrical signals at an intermediate frequency band and to let pass electrical signals at the lower frequency band.

8. The antenna structure of claim 7, wherein a magnitude of an impedance of the filter is greater at the intermediate frequency band than the magnitude of the impedance of the filter at each of the lower frequency band and the upper frequency band.

9. The antenna structure of claim 1, wherein one or both of the inner conductor and the outer conductor is circular.

10. The antenna structure of claim 1, wherein the one or more feeds are configured to carry the radio waves at the upper frequency band received by the high-frequency patch and the radio waves at the lower frequency band received by the low-frequency patch.

11. The antenna structure of claim 1, wherein the horizontal portion of each of the one or more feeds is horizontally tapered in the outward radial direction.

12. A global navigation satellite system (GNSS) receiver comprising:

an antenna configured to receive radio waves at global navigation satellite system (GNSS) frequencies, the antenna comprising:

an inner conductor having one or more feed holes, the inner conductor forming a high-frequency patch operable to receive radio waves at an upper frequency band;

an outer conductor surrounding the inner conductor in a radial direction, the outer conductor forming a low-frequency patch operable to receive radio waves at a lower frequency band; and one or more feeds that respectively pass through one of the one or more feed holes in a vertical direction, the one or more feeds each including a horizontal portion that extends in an outward radial direction from the one or more feed holes toward the outer conductor and is conductively connected to the outer conductor, wherein the horizontal portion of each of the one or more feeds is tapered in the outward radial direction.

13. The GNSS receiver of claim 12, wherein the antenna further comprises:

a ground plane disposed below the inner conductor and the outer conductor, wherein the ground plane is electrically conducting.

14. The GNSS receiver of claim 13, wherein the antenna further comprises:

a dielectric layer disposed between the ground plane and the inner conductor, wherein the dielectric layer is electrically insulating.

15. The GNSS receiver of claim 12, wherein the antenna further comprises:

a filter disposed along an outer edge of the outer conductor, the filter being configured to at least partially block electrical signals at an intermediate frequency band and to let pass electrical signals at the lower frequency band.

16. The GNSS receiver of claim 12, wherein the horizontal portion of each of the one or more feeds is horizontally tapered in the outward radial direction.

17. A method of receiving radio waves by an antenna structure, the method comprising:

receiving, by a high-frequency patch of the antenna, radio waves at an upper frequency band, wherein the high-frequency patch is formed by an inner conductor having one or more feed holes;

receiving, by a low-frequency patch of the antenna, radio waves at a lower frequency band, wherein the low-frequency patch is formed by an outer conductor surrounding the inner conductor in a radial direction; and carrying, using one or more feeds conductively connected to the outer conductor, the radio waves at the upper frequency band received by the high-frequency patch and the radio waves at the lower frequency band received by the low-frequency patch, wherein the one or more feeds respectively pass through one of the one or more feed holes in a vertical direction, the one or more feeds each including a horizontal portion that extends in an outward radial direction from the one or more feed holes toward the outer conductor and is conductively connected to the outer conductor, wherein the horizontal portion of each of the one or more feeds is tapered in the outward radial direction.

18. The method of claim 17, wherein the antenna further comprises a ground plane disposed below the inner conductor and the outer conductor, wherein the ground plane is electrically conducting.

19. The method of claim 18, wherein the antenna further comprises a dielectric layer disposed between the ground plane and the inner conductor, wherein the dielectric layer is electrically insulating.

20. The method of claim 17, wherein the antenna further comprises a filter disposed along an outer edge of the outer conductor, the filter being configured to at least partially block electrical signals at an intermediate frequency band and to let pass electrical signals at the lower frequency band.

* * * * *